(12) United States Patent
Shiraishi

(10) Patent No.: US 11,740,567 B2
(45) Date of Patent: Aug. 29, 2023

(54) OPTICAL DEVICE AND MANUFACTURING METHOD OF THE SAME

(71) Applicant: TOSHIBA TEC KABUSHIKI KAISHA, Tokyo (JP)

(72) Inventor: Takashi Shiraishi, Kawasaki Kanagawa (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 188 days.

(21) Appl. No.: 17/158,525

(22) Filed: Jan. 26, 2021

(65) Prior Publication Data

US 2021/0271185 A1    Sep. 2, 2021

(30) Foreign Application Priority Data

Mar. 2, 2020    (JP) .................. 2020-034593

(51) Int. Cl.
G03G 15/04    (2006.01)
G02B 17/00    (2006.01)

(52) U.S. Cl.
CPC ....... G03G 15/0409 (2013.01); G02B 17/002 (2013.01); *G03G 2215/0132* (2013.01)

(58) Field of Classification Search
CPC .................................. G03G 15/0409
See application file for complete search history.

(56) References Cited

U.S. PATENT DOCUMENTS

2010/0128330 A1* 5/2010 Kimura ............... H04N 1/0318
                                                              358/475
2016/0216634 A1    7/2016 Shiraishi

* cited by examiner

*Primary Examiner* — Walter L Lindsay, Jr.
*Assistant Examiner* — Andrew V Do
(74) *Attorney, Agent, or Firm* — Kim & Stewart LLP

(57) ABSTRACT

An optical device includes a lens mirror array, in which transparent optical elements are connected to each other along a first direction, and a case, in which the lens mirror array is contained and fixed. The case includes at least three holes through which a manufacturing jig can pass. The jig can be used to press the lens mirror array in a direction intersecting the first direction at three or more positions on the lens mirror array to deform the lens mirror array to correct for possible distortions in the optical device prior to the fixing of the lens mirror array to the case.

19 Claims, 23 Drawing Sheets

OPTICAL DEVICE AND MANUFACTURING METHOD OF THE SAME

CROSS-REFERENCE TO RELATED APPLICATION

This application is based upon and claims the benefit of priority from Japanese Patent Application No. 2020-034593, filed on Mar. 2, 2020, the entire contents of which are incorporated herein by reference.

FIELD

Embodiments described herein relate generally to an optical device incorporated into a document reading device or an exposure device of a copying machine, a multifunction machine, a printer, a scanner, or the like and a manufacturing method of the optical device.

BACKGROUND

In recent years, a solid-state scanning LED copying machine having an exposure optical system, in which a plurality of semiconductor light emitting elements arranged in parallel in a main scanning direction are used as a light source, is in widespread use. An exposure device that forms an electrostatic latent image on a surface of a photoconductive drum of the LED copying machine includes a lens mirror array that refracts and reflects light from the light source based on an image signal to focus the light onto the surface of the photoconductive drum. The lens mirror array includes, for example, a plurality of optical elements that concentrate light onto the surface of the photoconductive drum from a plurality of LED elements arranged in the main scanning direction. The lens mirror array is formed of, for example, transparent resin and has a structure obtained by integrally connecting the plurality of optical elements with each other in the main scanning direction.

DETAILED DESCRIPTION

Figure 1:
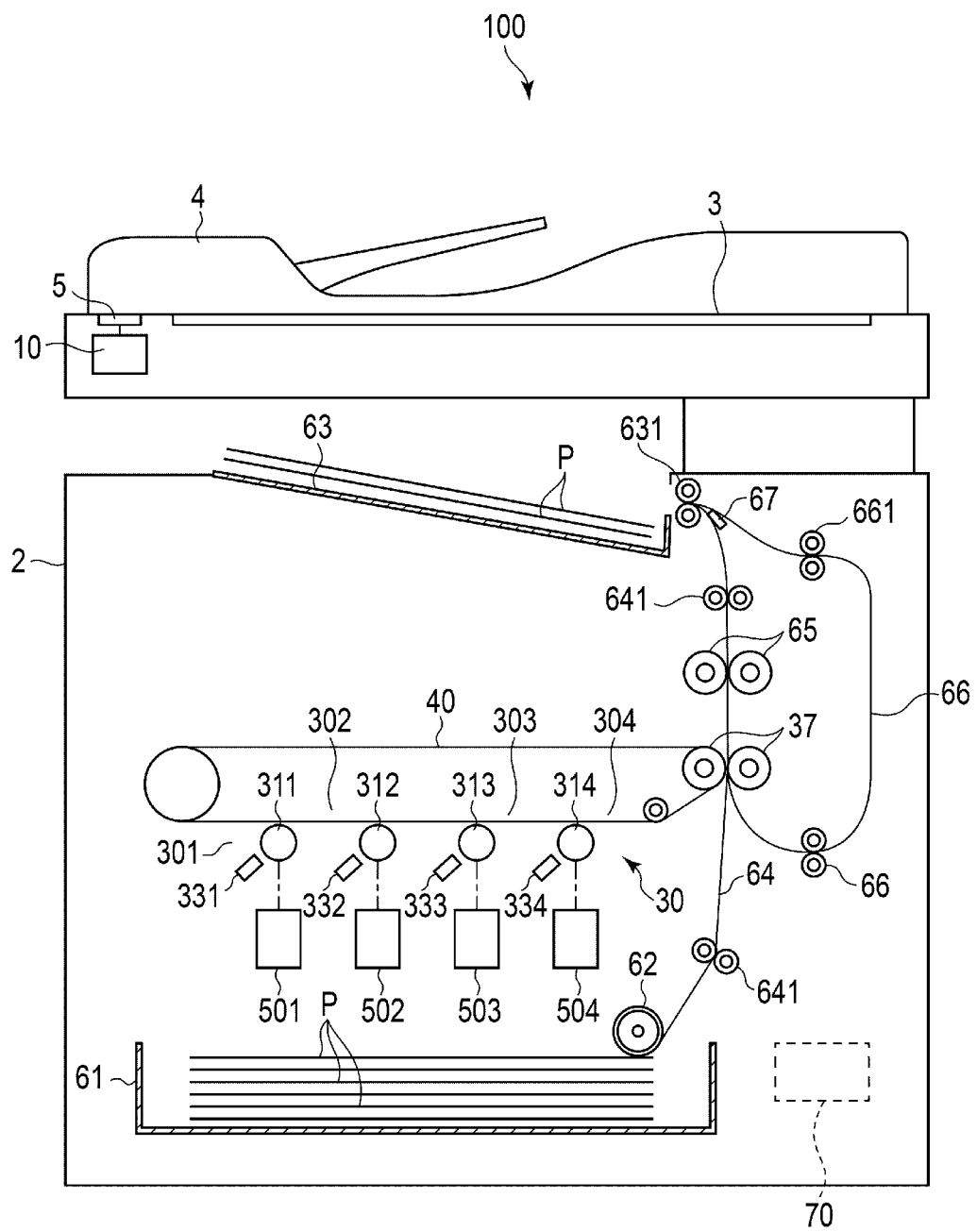
FIG. 1 is a schematic view showing a copying machine according to an embodiment.

In the case of a light source in which a plurality of LED elements are arranged in a main scanning direction, there may be a positional deviation between the elements since it is not easy to mount the plurality of LED elements in a straight line on a surface of a substrate. In addition, high dimensional accuracy is required for the mold used for manufacture of the lens mirror arrays, and it is not easy to manufacture a lens mirror array having the desired length with high dimensional accuracy. Therefore, a method of manufacturing multiple pieces of a lens mirror array and then connecting the different pieces into a lens array desired length is considered. However, in such a case, there may be a positional deviation between optical elements at the joints of the different pieces that have been connected.

When there is a distortion in a light source or a distortion in a lens mirror array as described above, an electrostatic latent image formed on a surface of a photoconductive drum deviates from its intended position (s) and thus image quality can be deteriorated.

Accordingly, it is desired to develop an optical device with which it is possible to correct distortion that might be caused a component constituting the device.

According to an embodiment, an optical device has a lens mirror array including a plurality of transparent optical elements connected to each other along a first direction and a case in which the lens mirror array is contained. The lens mirror array is fixed to the case. The case includes jig insertion holes through which a manufacturing jig can pass. The jig insertion holes are spaced from each other in the first direction. The case includes at least three jig insertion holes through which the manufacturing jig can pass. The jig insertion holes permit portions of the manufacturing jig to press the lens mirror array in a direction intersecting the first direction to deform the lens mirror array to correct for distortions in the optical device.

In addition, according to another embodiment, a manufacturing method for an optical device includes placing a lens mirror array in a case. The lens mirror array comprises a plurality of transparent optical elements connected to each other along a first direction. The case includes jig insertion holes through which a manufacturing jig can pass. The jig insertion holes are spaced from each other in the first direction. While the lens mirror array is in the case, the lens mirror array is deformed to compensate for a distortion in the optical device. The lens mirror array is deformed by pressing on the lens mirror array by passing portions of the manufacturing jig through the jig insertion holes. While the lens mirror array is being deformed to compensate for the distortion, the lens mirror array is fixed to case with an adhesive in such a manner that the lens mirror array remains deformed after removal of the manufacturing jig. The case includes at least three jig insertion holes. The lens mirror array is pressed by portions of the jig at three or more positions to compensate for the distortion in the optical device.

Hereinafter, certain example embodiments will be described with reference to the drawings.

FIG. 1 is a schematic view showing a copying machine 100, which is an embodiment of an image forming apparatus. The copying machine 100 is a solid-state scanning LED copying machine having an exposure optical system, in which a plurality of semiconductor light emitting elements such as LEDs are used as a light source, for example.

The copying machine 100 includes a housing 2. A transparent original document table glass 3 on which an original document can be set is provided on an upper surface of the housing 2. An automatic document feeder (ADF) 4 is provided on the original document table glass 3. The ADF 4 is provided on the original document table glass 3 such that the ADF 4 can be opened and closed. The ADF 4 functions as a document retainer retaining an original document that has been placed on the original document table glass 3 and has a function of feeding an original document through a document reading position (reading glass 5).

Figure 2:
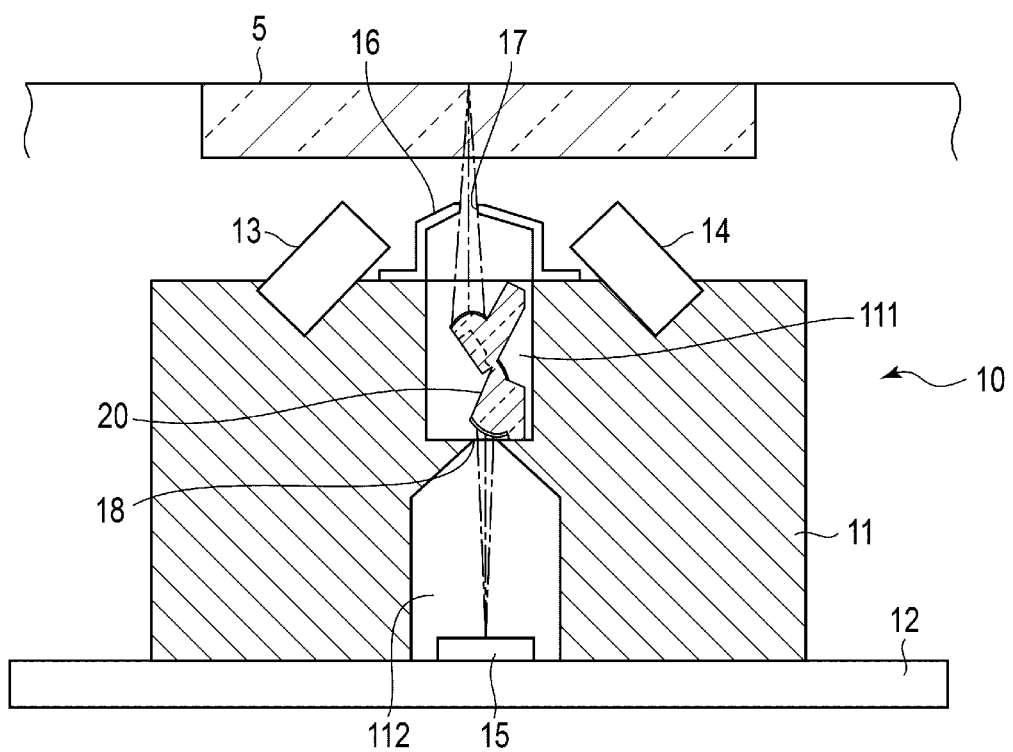
FIG. 2 is a schematic view showing a document reading device.

A document reading device 10 is provided below the original document table glass 3. The document reading device 10 is an embodiment of an optical device. FIG. 2 is a schematic view showing the document reading device 10. The document reading device 10 is provided such that the document reading device 10 can be moved by a driving mechanism in a lateral direction (referred to as a "sub-scanning direction") along the original document table glass 3 and is provided such that the document reading device 10 can be fixed to a position below the transparent reading glass 5 (position as shown in FIG. 1) that is arranged to be flush with the original document table glass 3.

As shown in FIG. 2, the document reading device 10 includes a rectangular block-shaped support 11. The support 11 extends in a direction (referred to as a "main scanning direction") that is orthogonal to the page surface of FIG. 2. The support 11 is disposed on a substrate 12. The substrate 12 extends in the main scanning direction in a horizontal posture. The substrate 12 and the support 11 are provided such that the substrate 12 and the support 11 can be moved in the sub-scanning direction below the original document table glass 3.

Two illuminating devices 13 and 14 are provided at an upper surface of the support 11. The upper surface is on the original document table glass 3 side (reading glass 5 side) of support 11. The illuminating devices 13 and 14 extend in the main scanning direction and are separated from each other in the lateral direction (sub-scanning direction) in FIG. 2. The illuminating devices 13 and 14 illuminate an original document that has been placed on the original document table glass 3 while moving in the sub-scanning direction along with the support 11 and illuminate an original document through the reading glass 5. The illuminating devices 13 and 14 are attached to the support 11 in an inclined posture such that illumination light thereof is directed toward a reading region of an original document.

The illuminating devices 13 and 14 include light sources obtained by arranging a plurality of LED elements along the main scanning direction and include light guide bodies extending in the main scanning direction. As the illuminating devices 13 and 14, a fluorescent tube, a xenon tube, a cold cathode ray tube, an organic EL, or the like can be used instead.

Figure 3:
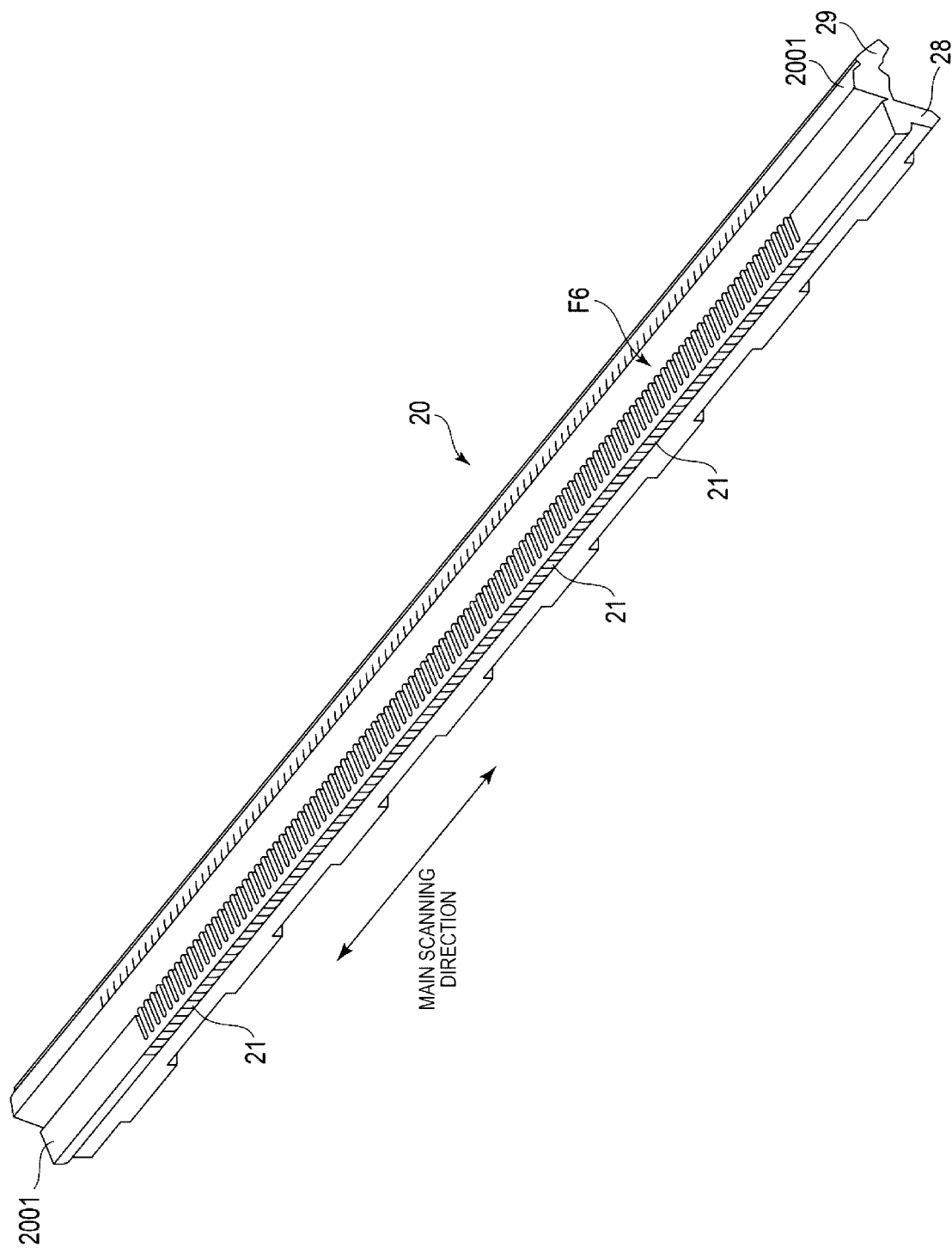
FIG. 3 is an external perspective view showing a lens mirror array.

The support 11 supports a lens mirror array 20 at a position close to the upper surface thereof that is between the two illuminating devices 13 and 14. FIG. 3 is an external perspective view of the lens mirror array 20. The lens mirror array 20 extends in the main scanning direction (first direction) and functions such that an erect image of an original document is formed on an image sensor 15 mounted onto the substrate 12. Additional aspects of the lens mirror array 20 will be described below.

The image sensor 15 is a line sensor in which a plurality of imaging elements (light receiving elements) that convert light into electric signals (image signals) are arranged in a line. The image sensor 15 can be one line sensor or a plurality of line sensors. The plurality of imaging elements of the image sensor 15 are arranged along the main scanning direction. The image sensor 15 is composed of, for example, a charge coupled device (CCD), a complimentary metal oxide semiconductor (CMOS), or another imaging element type.

A light blocking member 16 is attached to the upper surface of the support 11. The light blocking member 16 extends in the main scanning direction and includes a slit 17 that allows light reflected from an original document to pass therethrough and guides the light to the lens mirror array 20. In this example, light blocking member 16 has a structure obtained by bending a long rectangular plate along its longitudinal direction. Alight blocking material can be applied to a surface thereof. The slit 17 of the light blocking member 16 functions to prevent light other than light reflected from a predetermined area on the original document from being incident onto the lens mirror array 20.

The support 11 includes a slit 18 that extends in the main scanning direction on the image sensor 15 side of the lens mirror array 20. The support 11 includes a chamber 111 in which the lens mirror array 20 is contained and a chamber 112 in which the image sensor 15 is contained. The slit 18 is provided between the chambers 111 and 112. The slit 18 has a width such that light reflected from an original document then emitted from the lens mirror array 20 will pass therethrough and unnecessary light (also referred to as "noise light") that would otherwise become a noise component is blocked.

For example, when an original document is fed by the ADF 4 with the document reading device 10 fixed below the reading glass 5 (state as shown in FIG. 1 and FIG. 2), the illuminating devices 13 and 14 illuminate the original document via the reading glass 5. Light reflected from the original document is then incident onto the lens mirror array 20 via the slit 17. The lens mirror array 20 reflects and concentrates the light reflected from the original document and emits this light toward the image sensor 15 via the slit 18. The image sensor 15 thus receives light reflected from the original document (via the lens mirror array 20) to form an image on the image sensor 15. The image sensor 15 thus outputs an image signal corresponding to light reflected from the original document through photoelectric conversion.

At this time, an erect image of the original document that passes through a position above the reading glass 5 by operation of the ADF 4 is read line-by-line along the main scanning direction. The erect image is formed on the image sensor 15 by the lens mirror array 20. In addition, when the original document passes by the reading glass 5 in the sub-scanning direction, an image of the entire original document (corresponding to a plurality of image lines) can be acquired. Even if the original document is set on the original document table glass 3 and the document reading device 10 is moved in the sub-scanning direction along the original document table glass 3, the original document can be read in a line-by-line manner along the main scanning direction and an image of the entire original document can be acquired.

As shown in FIG. 1, the copying machine 100 includes an image forming unit 30 at the approximately center of the inside of the housing 2. The image forming unit 30 includes a yellow image forming unit 301, a magenta image forming unit 302, a cyan image forming unit 303, and a black image forming unit 304 along a traveling direction of an intermediate transfer belt 40. Since the image forming units 301, 302, 303, and 304 of the respective colors have the approximately same structure, here, the black image forming unit 304 will be described as a representative and description on the details of the image forming units 301, 302, and 303 of the other colors will be omitted.

Figure 4:
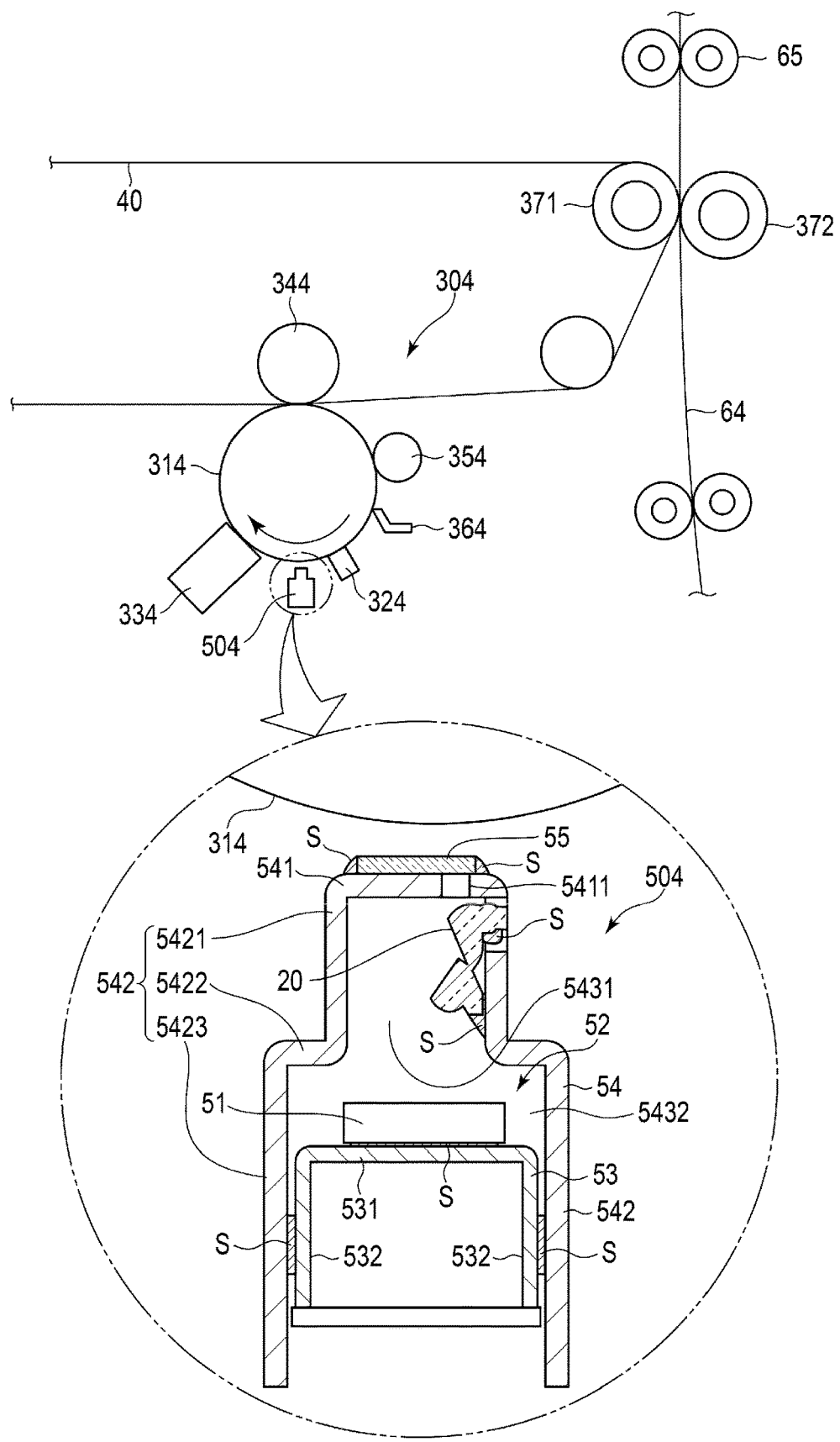
FIG. 4 is a schematic view showing aspects of an exposure device of an image forming unit in an enlarged manner.

FIG. 4 is an enlarged schematic view showing the black image forming unit 304 and a structure in the vicinity thereof. The black image forming unit 304 includes, for example, a photoconductive drum 314, an electric charger 324, an exposure device 504, a developing unit 334, a primary transfer roller 344, a cleaner 354, and a blade 364. The exposure device 504 is an embodiment of an optical device.

The photoconductive drum 314 includes a rotary shaft extending in the main scanning direction and is able to rotate with the outer peripheral surface in contact with a surface of the intermediate transfer belt 40. The primary transfer roller 344 is provided at a position inside the intermediate transfer belt 40 that faces the photoconductive drum 314. The photoconductive drum 314 is rotated in a direction (clockwise direction) along the arrow in the drawing at the same peripheral speed as the intermediate transfer belt 40, by a driving mechanism.

The electric charger 324 uniformly charges a surface of the photoconductive drum 314. The exposure device 504 irradiates the surface of the photoconductive drum 314 with exposure light based on an image signal for black obtained through color separation of the image data to be printed to form an electrostatic latent image based on the image signal for black on the surface of the photoconductive drum 314. The developing unit 334 supplies black toner to the electrostatic latent image formed on the surface of the photoconductive drum 314 to form a black toner image on the surface of the photoconductive drum 314.

The primary transfer roller 344 transfers the black toner image formed on the surface of the photoconductive drum 314 to the intermediate transfer belt 40 with the black toner image superimposed onto toner images of the other colors. The cleaner 354 and the blade 364 remove the toner remaining on the surface of the photoconductive drum 314 after transfer of the toner image to the intermediate transfer belt 40. The toner images of the various colors that are transferred to the surface of the intermediate transfer belt 40 such that the toner images are stacked onto each other. These toner images are sent to a position between a pair of secondary transfer rollers 371 and 372 (may be collectively referred to as a transfer roller pair 37 (see FIG. 1) in following description) with the traveling of the intermediate transfer belt 40.

As shown in an enlarged manner in FIG. 4, the exposure device 504 of the black image forming unit 304 includes a lens mirror array 20, a light source unit 52, and a case 54. The constituent elements 20, 52, 54 of the exposure device 504 extend in the main scanning direction, which is parallel to the rotary shaft of the photoconductive drum 314 and have the approximately same length as the photoconductive drum 314 in the main scanning direction. The exposure device 504 is provided below the photoconductive drum 314 such that the exposure device 504 is separated from the photoconductive drum 314 and faces the photoconductive drum 314.

The lens mirror array 20 having the same structure as the lens mirror array 20 of the document reading device 10 as described above is contained in the case 54. This lens mirror array 20 is attached to the inside of the case 54 with the lens mirror array 20 turned upside down in comparison with the document reading device 10. In addition, the light source unit 52 is attached to the inside of the case 54. The case 54 functions as a positional fixer that holds light source 51 (optical member) of the light source unit 52 and the lens mirror array 20 in a state of positional alignment with each other.

Figure 14:
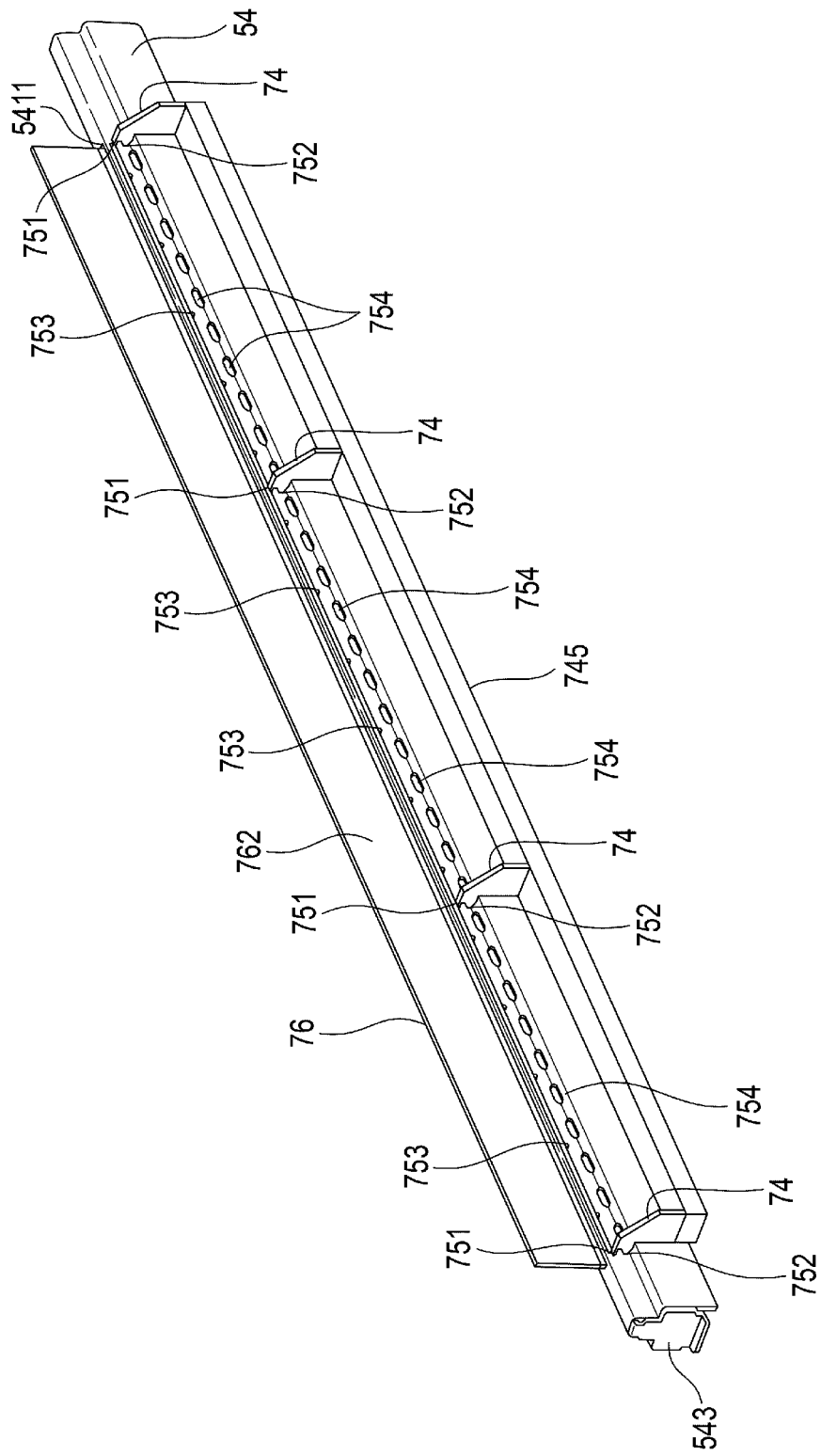
FIG. 14 is an external perspective corresponding to FIG. 13.

The case 54 integrally includes a top wall 541 and two side walls 542 and 542. The top wall 541 includes a slit 5411 extending in the main scanning direction. The case 54 can be formed through machining of a rectangular metal plate. The top wall 541 is formed in a long rectangular plate-shape and is disposed to face the surface of the photoconductive drum 314. Each side wall 542 is formed to have an upper wall portion 5421, a shoulder wall portion 5422, and a lower wall portion 5423. Thus, each side wall 542 can be said to have an approximately Z-shaped cross-sectional shape. The two side walls 542 have shapes that can be obtained by horizontally flipping the same structure. The case 54 includes two end walls 543 (only one of end walls is shown in FIG. 14) disposed at opposite ends in the main scanning direction, in addition to those described above.

The upper wall portions 5421 of the side walls 542 are integrally connected to opposite sides of the top wall 541 in the sub-scanning direction. The upper wall portions 5421 extend away from the photoconductive drum 314 from the edges of the top wall 541 in the sub-scanning direction. The upper wall portions 5421 extend in a direction approximately orthogonal to the top wall 541. The shoulder wall portions 5422 are integrally connected to one of the upper wall portions 5421. The shoulder wall portions 5422 extend outward in the sub-scanning direction from the upper wall portions 5421 away from each other. The shoulder wall portions 5422 are approximately orthogonal to the upper wall portions 5421. The lower wall portions 5423 are integrally connected to one of the shoulder wall portions 5422. The lower wall portions 5423 extend in a direction away from the photoconductive drum 314 from the shoulder wall portions 5422. The lower wall portions 5423 are approximately orthogonal to the shoulder wall portions 5422.

A containing space 5431 between the two upper wall portions 5421, of which the width in the sub-scanning direction is relatively small, and a containing space 5432 between the two lower wall portions 5423, of which the width in the sub-scanning direction is relatively large, are provided inside the case 54. The lens mirror array 20 is disposed in the containing space 5431 that is closer to the photoconductive drum 314. The light source unit 52 is disposed in the containing space 5432 that is farther from the photoconductive drum 314.

The slit 5411 provided in the top wall 541 of the case 54 has a width in the sub-scanning direction such that light components necessary for exposure pass therethrough and noise light is blocked. Long rectangular plate-shaped protection glass 55 having a size sufficient to cover the entire length of the slit 5411 is fixed to an outer surface of the top wall 541 that is on the photoconductive drum 314 side, by means of an adhesive S. The protection glass 55 prevents toner, dust, or the like from adhering to the lens mirror array 20.

The lens mirror array 20 extends in the main scanning direction and is disposed in the containing space 5431. The lens mirror array 20 is fixed to an inner surface of one of the upper wall portions 5421 of the case 54 by means of the adhesive S after being positioned and deformed as necessary. The lens mirror array 20 is fixed (held) at a plurality of positions that are separated from each other in the main scanning direction. The lens mirror array 20 reflects and concentrates light incident from the light source 51 of the light source unit 52 and emits light toward the surface of the photoconductive drum 314.

The light source unit 52 includes the light source 51 and a holder 53. The holder 53 has a structure that extends in the main scanning direction and has a U-shaped cross-section. The holder 53 includes a top wall 531 to which the light source 51 is attached. The top wall 531 is formed in a long rectangular plate-shape. The holder 53 includes two side walls 532 continuously extending from edges of the top wall 531 in the sub-scanning direction. Each side wall 532 is formed in a long rectangular plate-shape. The two side walls 532 extend to a side opposite to the light source 51 from the edges of the top wall 531 in a direction approximately orthogonal to the light source 51. The holder 53 can be formed through machining of a rectangular plate-shaped metal plate, for example. After the holder 53 is positioned, the holder 53 is fixed to the case 54 with outer surfaces of the side walls 532 bonded to inner surfaces of the lower wall portions 5423 of the case 54 by means of the adhesive S.

The light source 51 is fixed to a surface of the top wall 531 of the holder 53 by means of the adhesive S, the surface being on the lens mirror array 20 side. The light source 51 is obtained by, for example, arranging a plurality of light emitting elements along the main scanning direction and mounting these light emitting elements in a line on a surface of a substrate or a surface of a glass plate. The light source 51 includes the plurality of light emitting elements arranged in one line or in a plurality of lines.

The light source 51 emits light based on image data (image signal) for black obtained through color separation of image data acquired by the document reading device 10 or image data acquired via an external device such as a personal computer. The plurality of light emitting elements of the light source 51 are, for example, LEDs or OLEDs that emit light or are turned off based on image data.

Light emitted from the light source 51 is incident onto the lens mirror array 20 disposed in the containing space 5431. The lens mirror array 20 reflects and concentrates the light from the light source 51 and emits the light. The light emitted from the lens mirror array 20 is concentrated onto the surface of the rotating photoconductive drum 314 via the slit 5411 and the protection glass 55.

At this time, an electrostatic latent image is formed on the surface of the photoconductive drum 314 in a line-by-line manner along the main scanning direction, with the photoconductive drum 314 rotating. Then, when the photoconductive drum 314 rotates by a certain amount, an electrostatic latent image for black obtained through color separation, which corresponds to the entire image on the original document, is formed on the surface of the photoconductive drum 314.

As shown in FIG. 1, the copying machine 100 includes the transfer roller pair 37 that transfers, to a sheet P, the toner images of the respective colors that are transferred to the surface of the intermediate transfer belt 40 such that the toner images are superimposed onto each other. As shown in FIG. 4, one transfer roller 371 is disposed inside the intermediate transfer belt 40 and the intermediate transfer belt 40 is supported by the one transfer roller 371. The other transfer roller 372 is provided to face the one transfer roller 371 with the intermediate transfer belt 40 interposed therebetween. The toner images of the respective colors that are transferred to the surface of the intermediate transfer belt 40 such that the toner images are superimposed onto each other are sent to a nip of the transfer roller pair 37 with the intermediate transfer belt 40 traveling.

A paper feeding cassette 61, storing a plurality of sheets P having a predetermined size, is provided near a lower end of the inside of the housing 2 of the copying machine 100. The paper feeding cassette 61 is provided such that the paper feeding cassette 61 can be withdrawn from a front surface of the housing 2 and inserted into the housing 2. A pickup roller 62 that picks up an uppermost sheet P in a stacking direction from among the sheets P contained in the paper feeding cassette 61 is disposed above a right end of the paper feeding cassette 61 as seen in the drawing. The pickup roller 62 picks up the sheets P one by one by rotating with a peripheral surface thereof being in contact with the sheets P.

A paper discharge tray 63 is provided on an upper side in the housing 2. The paper discharge tray 63 is disposed below the original document table glass 3 and the sheet P with an image formed thereon is discharged into a body of the copying machine 100. A conveyance path 64 through which the sheet P picked up from the paper feeding cassette 61 is conveyed to the paper discharge tray 63 in a vertical direction is provided to extend between the pickup roller 62 and the paper discharge tray 63. The conveyance path 64 extends through the nip formed by the transfer roller pair 37 and includes a plurality of conveyance roller pairs 641 and a conveyance guide. A paper discharge roller pair 631 for discharging the sheet P to the paper discharge tray 63 is provided at a terminal end of the conveyance path 64. The paper discharge roller pair 631 can rotate in both of forward and backward directions.

A fixing roller pair 65 is disposed downstream of (above in drawing) the transfer roller pair 37 on the conveyance path 64. The fixing roller pair 65 heats and pressurizes the sheet P conveyed via the conveyance path 64 and fixes a toner image onto the surface of the sheet P.

The copying machine 100 includes an inversion conveyance path 66 (sheet reversing unit) by which the sheet P with an image formed on one surface thereof can be inverted and then sent to the nip of the transfer roller pair 37. The inversion conveyance path 66 includes a conveyance guide and a plurality of conveyance roller pairs 661 that convey the sheet P. A gate 67 that switches the conveyance destination of the sheet P between the conveyance path 64 and the inversion conveyance path 66 is provided upstream of the paper discharge roller pair 631.

When the pickup roller 62 rotates and the sheet P is picked up from the paper feeding cassette 61, the plurality of conveyance roller pairs 641 convey the sheet P toward the paper discharge tray 63 via the conveyance path 64. At this time, the toner images of the respective colors that have been transferred to the surface of the intermediate transfer belt 40 are sent to the nip of the transfer roller pair 37 in accordance with the timing of conveyance of the sheet P so the toner images of the respective colors can be transferred to the surface of the sheet P in conjunction with a transfer voltage (bias) applied at the transfer roller pair 37.

The sheet P to which the toner images have been transferred is heated and pressed when passing through the fixing roller pair 65 such that the toner images are melted and pressed against the sheet P and the toner images are thus fixed (fused) to the sheet P. The printed sheet P formed in this manner can then be discharged to the paper discharge tray 63 via the paper discharge roller pair 631.

If a duplex printing mode (in which an image is also to be formed on a back surface of the sheet P) is selected, immediately before a trailing end in a discharge direction of the sheet P being discharged passes through a nip of the paper discharge roller pair 631, the gate 67 switches to the inversion conveyance path 66, the paper discharge roller pair 631 rotates reversely, and the sheet P is subjected to switchback conveyance. As a result, the trailing end of the sheet P is directed toward the inversion conveyance path 66 and the sheet P is inverted and sent again to the transfer roller pair 37.

Toner images based on data of the image to be formed on the back surface of the sheet P are formed on the surface of the intermediate transfer belt 40 during this process, and the toner images of respective colors for the back surface image are sent to the nip of the transfer roller pair 37 by the traveling of the intermediate transfer belt 40. Then, these toner images are transferred and then fixed to the back surface of the sheet P. The twice printed sheet P can then be discharged to the paper discharge tray 63 via the paper discharge roller pair 631.

The copying machine 100 includes a control unit 70 that controls the operations of the above-described mechanisms. The control unit 70 includes a processor, such as a CPU, and a memory. The control unit 70 realizes various processing functions by the processor executing a program stored in the memory. The control unit 70 controls the document reading device 10 such that an image is acquired from an original document. In addition, the control unit 70 controls the image forming unit 30 such that an image is formed on a surface of the sheet P. For example, the control unit 70 inputs image data read by the document reading device 10 to the image forming unit 30. The control unit 70 controls the operations of the plurality of conveyance roller pairs 641 and 661 such that the sheet P is conveyed through the conveyance path 64 and the inversion conveyance path 66.

Figure 5:
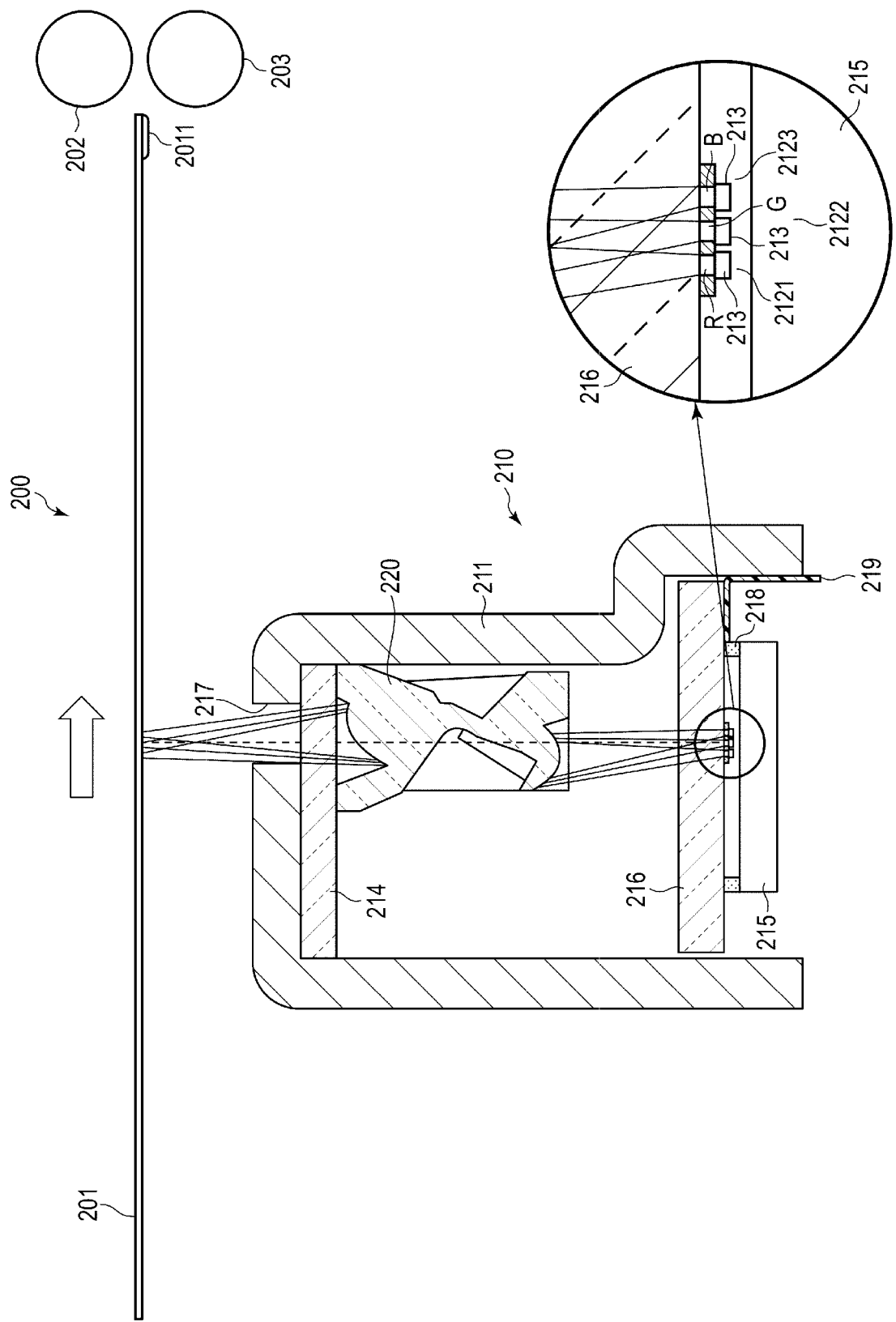
FIG. 5 is a schematic view of a printer according to an embodiment.

FIG. 5 is a schematic view showing a main portion of a printer 200, which is another embodiment of an image forming apparatus. The printer 200 is, for example, a printer incorporated into an instant camera or a printer for instant photography by which an image captured by a digital camera or the like can be printed or developed.

The printer 200 includes a conveyance mechanism that conveys a photosensitive medium 201, such as a silver halide photographic film, in a direction along the arrow shown in the drawing (rightward direction in FIG. 5). The photosensitive medium 201 is conveyed in a horizontal posture by the conveyance mechanism. The photosensitive medium 201 includes a containing portion 2011 containing a developer. The containing portion 2011 is on a tip end (leading edge) side in the conveyance direction. A pair of pressing rollers 202 and 203 that nips and presses the photosensitive medium 201 breaks a seal or the like of the containing portion 2011. The pressing rollers 202 and 203 are provided on the conveyance path along which the photosensitive medium 201 is conveyed. The pressing rollers 202 and 203 each have a length greater than the width of the photosensitive medium 201 in a direction orthogonal to the conveyance direction.

The photosensitive medium 201 is conveyed through a space between the pair of pressing rollers 202 and 203. At least one of the pressing rollers 202 and 203 is urged in a direction such that the pressing rollers 202 and 203 become close to each other. Therefore, the photosensitive medium 201 is crushed (pressed firmly) between the pair of pressing rollers 202 and 203. Accordingly, the containing portion 2011 is crushed by the pair of pressing rollers 202 and 203 such that the seal thereof is broken and then photosensitive medium 201 is further conveyed so that the now released developer is applied over the entire surface of the photosensitive medium 201.

An exposure device 210 is disposed below the conveyance path, as seen in the drawing. The exposure device 210 is spaced from the conveyance path but faces the conveyance path. The exposure device 210 forms, for example, a color latent image on the photosensitive medium 201 by irradiating a photosensitive surface of the photosensitive medium 201 as it is conveyed via the conveyance path. The color latent image may be formed with three-color (RGB) exposure light obtained through a color separation of image data. The exposure device 210 is disposed upstream of the pair of pressing rollers 202 and 203 along the conveyance path. The exposure device 210 is an embodiment of an optical device.

The exposure device 210 includes a support 211 that extends in a width direction orthogonal to the conveyance direction of the photosensitive medium 201. The support 211 supports a lens mirror array 220 that has the approximately same structure as the lens mirror array 20 that was described above. The lens mirror array 220 extends in the width direction, reflects and concentrates light incident from light sources 2121, 2122, and 2123, and emits this incident light toward the photosensitive surface of the photosensitive medium 201.

The light sources 2121, 2122, and 2123 are, for example, organic light emitting diodes (OLED) in which filters and apertures are arranged to be staggered in two rows for each color with respect to white organic EL elements 213. The white organic EL elements 213 are attached to transparent glass 216. The OLEDs are isolated from outside air by the transparent glass 216, a sealing plate 215, and an adhesive 218 that is applied to an outer periphery of the sealing plate 215. The adhesive 218 is thus provided in a frame-like shape sealing the space between the transparent glass 216 and the sealing plate 215 such that there is no moisture absorption. The white organic EL elements 213 are connected to a flexible substrate 219 and power is supplied thereto from a circuit on the flexible substrate 219. The support 211 supports the transparent glass 216 between the lens mirror array 220 and the light sources 2121, 2122, and 2123.

In addition, the support 211 supports transparent protection glass 214 at the photosensitive medium 201 side of the lens mirror array 220. The protection glass 214 protects the lens mirror array 220 and prevents dust from adhering to the lens mirror array 220. The protection glass 214 abuts one end of the lens mirror array 220 such that the lens mirror array 220 is positioned. The support 211 includes a slit 217 that extends in the width direction, on a light emission side of the protection glass 214. The slit 217 has a width such that light components necessary for exposure pass therethrough and noise light unnecessary for exposure is blocked.

When the photosensitive medium 201 is conveyed and irradiated with light from the light sources 2121, 2122, and 2123 via the lens mirror array 220, a color latent image is formed on the photosensitive medium 201. When the photosensitive medium 201 is further conveyed after this latent image forming process, the photosensitive medium 201 is pressed by the pair of pressing rollers 202 and 203, the seal of the containing portion 2011 of is thus broken, and the developer is supplied to the photosensitive medium 201. As a result, the color latent image on the photosensitive medium 201 is developed and a color image is formed (printed) on the photosensitive medium 201.

Figure 6:
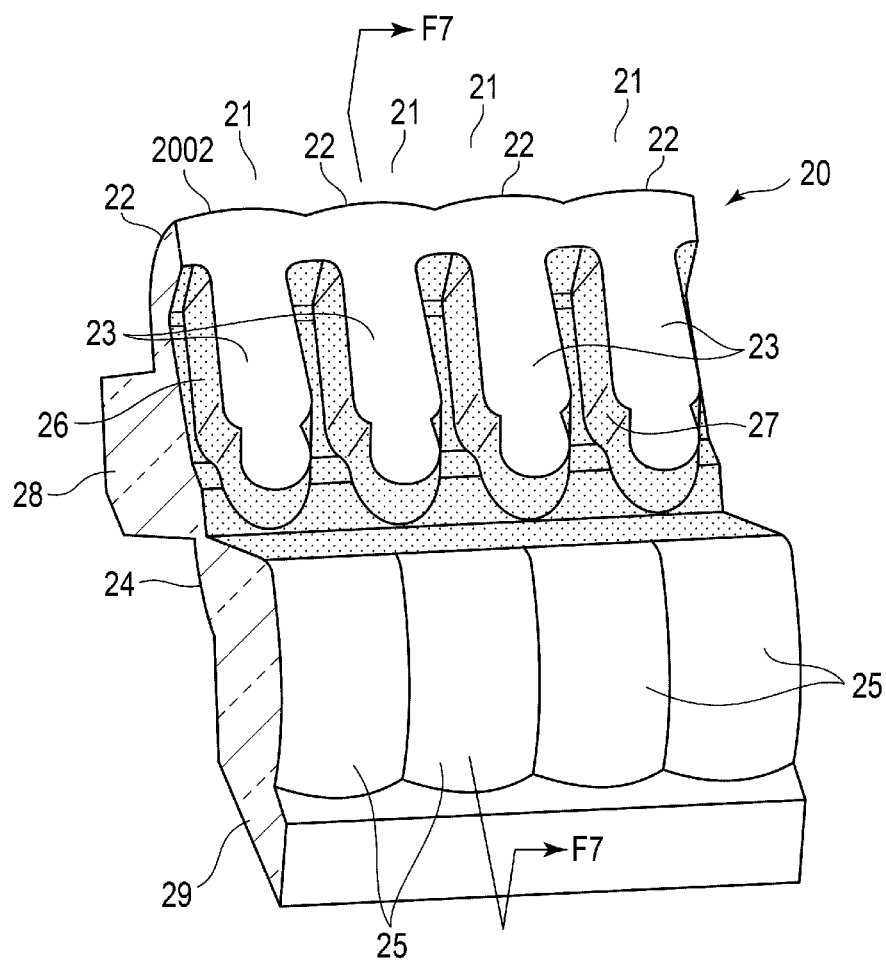
FIG. 6 is an external perspective view showing a portion of a lens mirror array.
Figure 7:
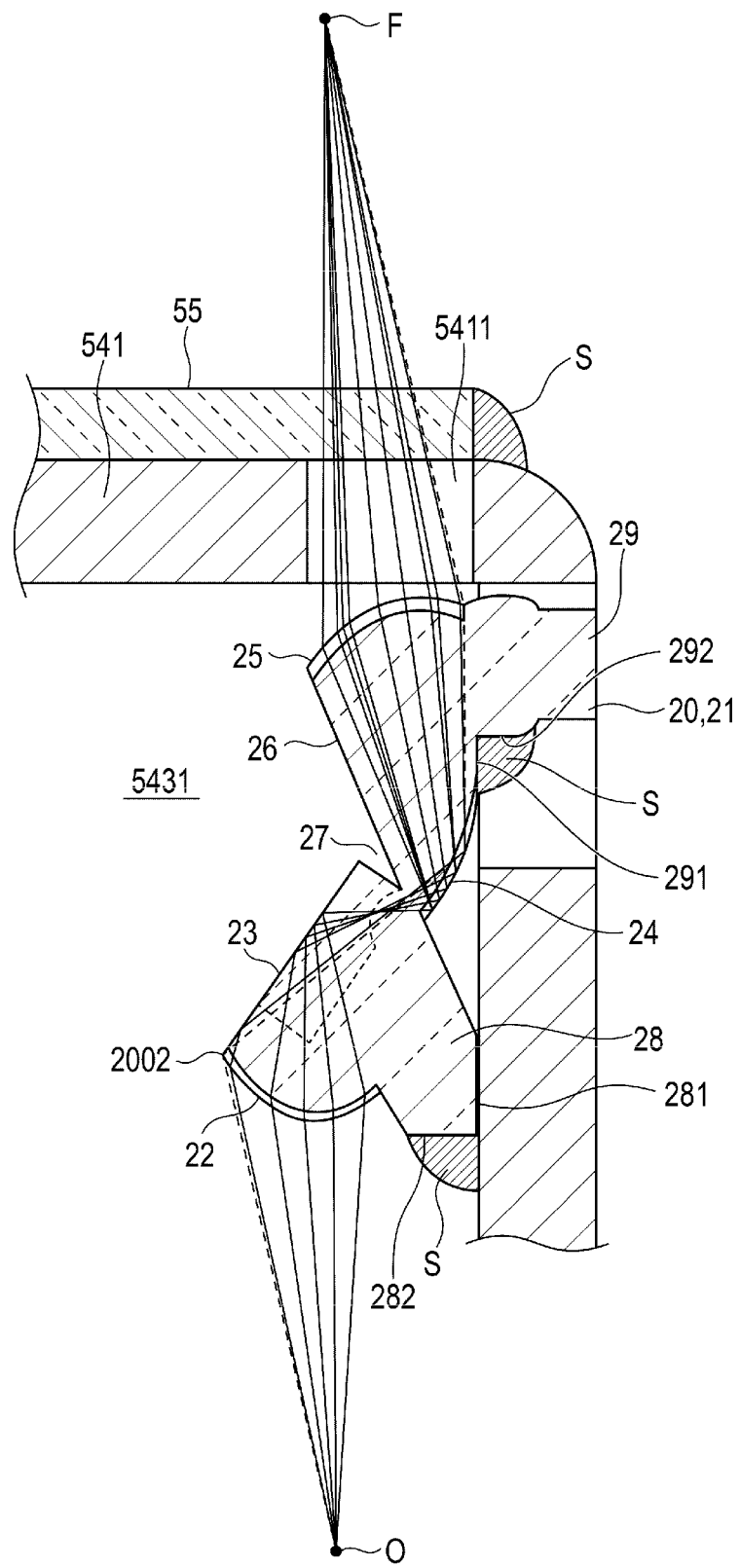
FIG. 7 is a cross-sectional view of the lens mirror array taken along line F7-F7.

Hereinafter, the lens mirror array 20 will be described with reference to FIGS. 3, 6, and 7. FIG. 3 is an external perspective view of the lens mirror array 20 and FIG. 6 is a partially enlarged perspective view of the lens mirror array 20. In addition, FIG. 7 is a sectional view of the lens mirror array 20 taken along a plane that passes through the center of one optical element 21 of the lens mirror array 20 in the main scanning direction and is orthogonal to the longitudinal direction of the lens mirror array 20. Since the lens mirror array 220 in the other embodiment described above has the approximately same structure as the lens mirror array 20 described here, here, the lens mirror array 20 will be described as a representative and description on the lens mirror array 220 will be omitted.

The lens mirror array 20 is incorporated into the document reading device 10 and exposure devices 501, 502, 503, and 504 in a posture in which the longitudinal direction thereof is parallel to the main scanning direction. The lens mirror array 20 has a structure in which a plurality of the transparent optical elements 21 (only four optical elements are shown in FIG. 6) having the approximately same shape are arranged in the main scanning direction and integrated with each other. In addition to the plurality of optical elements 21, the lens mirror array 20 includes, at both ends in the longitudinal direction thereof, extension portions 2001 that an operator can touch when gripping the lens mirror array 20 with fingers. In the present embodiment, the lens mirror array 20 is formed through integral molding of transparent resin. The lens mirror array 20 may be formed of transparent glass.

Each optical element 21 of the lens mirror array 20 guides diffused light from object points O such that an image is formed at image formation points F. One optical element 21 forms an image on an image surface with light from a plurality of the object points O arranged in the main scanning direction. For example, one optical element 21 forms an image on the image surface with light from the object points O disposed within a width that is 2 to 3 times the pitch of the optical elements 21 in the main scanning direction. Each of the optical elements 21 of the lens mirror array 20 reflects the incident light twice and emits the light such that erect images of the object points O are formed at the image formation points F.

For example, if the lens mirror array 20 is incorporated into the document reading device 10 shown in FIG. 2, the plurality of optical elements 21 form an image on a light receiving surface of the image sensor 15 with light reflected from an original document. In addition, if the lens mirror array 20 is incorporated into the exposure device 504 shown in FIG. 4, the plurality of optical elements 21 form an image on the surface of the photoconductive drum 314 with light from the light source 51. For example, since the lens mirror array 20 of the exposure device 504 includes the plurality of optical elements 21 arranged in the main scanning direction, an elongated image is formed along the main scanning direction on the surface of the photoconductive drum 314.

Hereinafter, the structure and function of each optical element 21 will be described while using a case where the lens mirror array 20 is incorporated into the exposure device 504 as an example.

As shown in FIGS. 6 and 7, the optical elements 21 include incidence side lens surfaces 22, upstream side reflection surfaces 23, downstream side reflection surfaces 24, and emission side lens surfaces 25 as surfaces thereof. The incidence side lens surfaces 22, the downstream side reflection surfaces 24, and the emission side lens surfaces 25 are outwardly curved surfaces. The upstream side reflection surfaces 23 are flat surfaces. A ridge portion 2002 extending in a direction approximately parallel to the main scanning direction is provided between the incidence side lens surfaces 22 and the upstream side reflection surfaces 23. An imaginary boundary plane between two optical elements 21 adjacent to each other in the main scanning direction is a plane orthogonal to the main scanning direction and is a plane approximately orthogonal to the above-described surfaces 22, 23, 24, and 25.

The surfaces 22, 23, 24, and 25 of the optical elements 21 are surfaces extending approximately along the longitudinal direction of the lens mirror array 20. That is, in the lens mirror array 20 in which the plurality of optical elements 21 are integrally connected with each other in the main scanning direction, the surfaces 22, 23, 24, 25 of the optical elements 21 are continuous surfaces connected with each other in the main scanning direction. In addition, the lens mirror array 20 is fixed and attached to the case 54 in a posture in which the incidence side lens surfaces 22 of the plurality of optical elements 21 face the light source 51 (FIG. 4).

As shown in FIG. 7, focusing on one optical element 21, diffused light from the light source 51 placed at the object points O is incident onto the incidence side lens surface 22. In this case, the object points O are a plurality of points arranged in the main scanning direction, which is orthogonal to the page surface in FIG. 7. The incidence side lens surface 22 converges the diffused light incident thereon and forms an intermediate inverted image. The upstream side reflection surface 23 that continuously extends from the incidence side lens surface 22 with the ridge portion 2002 interposed therebetween reflects light incident via the incidence side lens surface 22 toward the downstream side reflection surface 24 through total reflection or Fresnel reflection.

The downstream side reflection surface 24 further reflects the light reflected from the upstream side reflection surface 23 toward the emission side lens surface 25 through total reflection or Fresnel reflection. The downstream side reflection surface 24 may be formed as a flat surface. The emission side lens surface 25 emits the light reflected from the downstream side reflection surface 24 to a surface of the photoconductive drum 314 disposed at the image formation points F. In this case, the image formation points F are also a plurality of points arranged in the main scanning direction, which is orthogonal to the page surface in FIG. 7. The emission side lens surface 25 cooperates with the downstream side reflection surface 24 to form an erect image, which is an inverted image of the intermediate inverted image formed by the incidence side lens surface 22. The light emitted from the emission side lens surface 25 forms an image at the surface of the photoconductive drum 314 disposed at the image formation points F.

A light blocking material 26 is applied to surfaces of the optical elements 21. The light blocking material 26 is applied to the surfaces of the optical elements 21 by means of a dispenser, an inkjet head, or the like. A portion to which the light blocking material 26 is applied is a hatched part in FIG. 6. The light blocking material 26 is, for example, an ink (for example, UV ink containing light blocking materials such as carbon black, pigment, or dye) having a high light blocking property obtained by using a polymer having substantially the same refractive index as the lens mirror array 20 as a base material. The light blocking material 26 prevents light transmitted inside the lens mirror array 20 from being reflected and prevents the light from being emitted to the outside of the lens mirror array 20.

As shown in FIG. 6, end portions of the upstream side reflection surfaces 23 of the plurality of optical elements 21 adjacent to each other in the main scanning direction are flush with each other, the end portions being on the ridge portion 2002 side close to the incidence side lens surfaces 22. In other words, a comb teeth-shaped groove 27 that separates the reflection surfaces from each other is provided between the upstream side reflection surfaces 23 of the plurality of optical elements 21. The groove 27 is formed to surround end portions of the plurality of upstream side reflection surfaces 23 that are separated from the incidence side lens surfaces 22 and defines ends of the emission side lens surfaces 25. The groove 27 is provided in the vicinity of the upstream side reflection surfaces 23 except for the ridge portion 2002.

In addition, the light blocking material 26 is applied to the entire surface of the comb teeth-shaped groove 27. For example, the light blocking material 26 is injected into the groove 27 by means of a dispenser and is applied to an inner surface of the groove 27 by means of a capillary phenomenon in the groove 27, wet-spreading, or the like. When the light blocking material 26 is applied to the inner surface of the groove 27 by means of a capillary phenomenon, wet-spreading, or the like, an appropriate amount of the light blocking material 26 can be continuously and quickly applied, the process can be simplified, and the light blocking material 26 can be uniformly applied to each optical element 21. In other words, in the present embodiment, no light blocking material 26 is applied to the surfaces (particularly, upstream side reflection surfaces 23) of the lens mirror array 20 except for the groove 27.

In addition, the lens mirror array 20 includes two flange portions 28 and 29 over the entire length thereof. The extension portions 2001 as described above include opposite ends of each of the flange portions 28 and 29 in the longitudinal direction. As shown in FIG. 7, the flange portion 28 on an incidence side is provided between the incidence side lens surfaces 22 and the downstream side reflection surfaces 24 of the plurality of optical elements 21. The flange portion 28 on the incidence side protrudes outward from a position between the plurality of incidence side lens surfaces 22 which are continuous in the longitudinal direction and the plurality of downstream side reflection surfaces 24 which are continuous in the longitudinal direction.

In addition, the flange portion 29 on an emission side is provided between the downstream side reflection surfaces 24 and the emission side lens surfaces 25 of the plurality of optical elements 21. The flange portion 29 on the emission side protrudes outward from a position between the plurality of downstream side reflection surfaces 24 which are continuous in the longitudinal direction and the plurality of emission side lens surfaces 25 which are continuous in the longitudinal direction.

The flange portion 28 on the incidence side includes an abutting surface 281 that comes into surface-contact with reference surfaces 743 of positioning pins 742 of positioning jigs 74, and an abutting surface 282 that comes into surface-contact with reference surfaces 744 of the positioning pins 742, as surfaces thereof. The abutting surface 281 is a surface that is parallel to the main scanning direction and is orthogonal to the sub-scanning direction. In addition, the abutting surface 282 is a surface that is parallel to the main scanning direction and is parallel to the sub-scanning direction. That is, the abutting surfaces 281 and 282 of the flange portion 28 on the incidence side are surfaces orthogonal to each other.

An abutting surface 291 that comes into surface-contact with reference surfaces 743 of positioning pins 741 is provided between the flange portion 29 on the emission side and the downstream side reflection surfaces 24. In addition, the flange portion 29 on the emission side includes an abutting surface 292 that comes into surface-contact with reference surfaces 744 of the positioning pins 741, as a surface thereof. The abutting surface 291 is a surface that is flush with the abutting surface 281 of the flange portion 28 on the incidence side and is a surface that is parallel to the main scanning direction and is orthogonal to the sub-scanning direction. In addition, the abutting surface 292 is a surface that is parallel to the main scanning direction and is parallel to the sub-scanning direction. That is, the abutting surfaces 291 and 292 are surfaces orthogonal to each other.

The lens mirror array 20 integrally includes a plurality of rectangular plate-shaped projecting pieces 283 (see FIGS. 11 and 15), which are not depicted in FIG. 7, in addition to those aspects already described above. The plurality of projecting pieces 283 are integral portions of the lens mirror array and protrude in the same direction from a tip end in a protruding direction of the flange portion 28 on the incidence side. The projecting pieces 283 are separated from each other in the main scanning direction and are provided over the approximately entire length of the flange portion 28.

The projecting pieces 283 are portions that can be nipped by (sandwiched between) jigs 71 and plate springs 72.

In the case of the lens mirror array 20 of the exposure device 504 described above, it is necessary to form an image on a surface of the photoconductive drum 314 by means of light emitted from the light source 51 with as little deviation as possible such that there is little to no deviation or distortion in the electrostatic latent image formed on the surface of the photoconductive drum 314. If the lens mirror array 20 is incorporated into the document reading device 10, the lens mirror array 20 needs to form an image on the light receiving surface of the image sensor 15 by means of light reflected from an original document with as little deviation as possible, so that the image on the original document is read with little to no deviation. That is, in order to form a high-quality image in the copying machine 100, the lens mirror array 20 needs to cause little to no deviation or distortion and thus the dimensional accuracy must be extremely high.

Therefore, for example, if the lens mirror array 20 is molded, it is necessary to make the dimensional accuracy of the mold(s) extremely high. However, it is generally not easy to manufacture a long mold with high dimensional accuracy and a long time may be taken to manufacture just one set of molds. Therefore, a method of manufacturing a lens array mold divided along a longitudinal direction and then connecting a plurality of shorter molded lens mirror array pieces to each other is considered. However, if the lens mirror array 20 is manufactured by such a method of combining shorter pieces into a longer piece, there is a possibility of a positional deviation between the optical elements 21 that are at or near a joint between the short lens mirror array pieces.

In addition, regarding the exposure device 504, a positional deviation between the plurality of light emitting elements of the light source 51 is conceivable as a potential cause of deviation or a distortion in an electrostatic latent image. Furthermore, regarding the document reading device 10, a positional deviation between the light receiving elements of the image sensor 15 is conceivable as a cause potential of deviation or a distortion in a read (scanned) image. Such a positional deviation between the light emitting elements or a positional deviation between the light receiving elements often has a certain specific tendency due to the device used for manufacturing the light source 51 or the image sensor 15. That is, if there is a positional deviation between light emitting elements or light receiving elements in the light sources 51 or the image sensors 15 that have been manufactured by the same manufacturing device, there is a high possibility that the deviation results from a tendency peculiar to the manufacturing device.

The same applies to the lens mirror array 20. For example, in the case of a manufacturing method in which a plurality of short lens mirror arrays are connected to each other, then due to the characteristics of the manufacturing device used for connecting the short lens mirror arrays, there is a high possibility that the positional deviation will have a tendency peculiar to the manufacturing device if there is a positional deviation between the optical elements 21 at a joint.

The present application provides a method of correcting one or both of a positional deviation (hereinafter, such deviation may be referred to as "distortion" of optical member) between the plurality of light emitting elements or the plurality of light receiving elements in an optical member, such as the light source 51 or the image sensor 15, and a positional deviation (hereinafter, such deviation may be referred to as "distortion" of lens mirror array 20) between the plurality of optical elements 21 of the lens mirror array 20.

Figure 8:
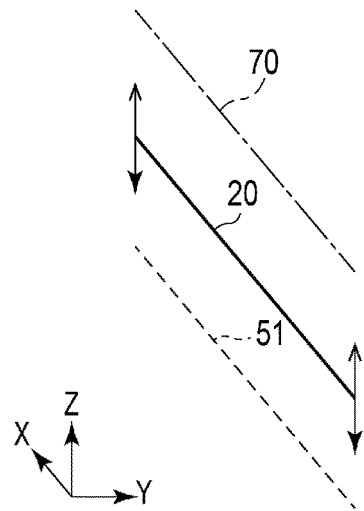
FIG. 8 is a diagram related to a method of correcting a distortion in an exposure device in the related art.
Figure 9:
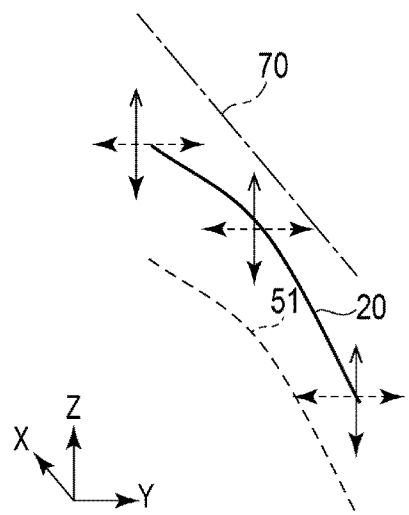
FIG. 9 is a diagram related to a method of correcting a distortion in the exposure device depicted in FIG. 4.
Figure 10:
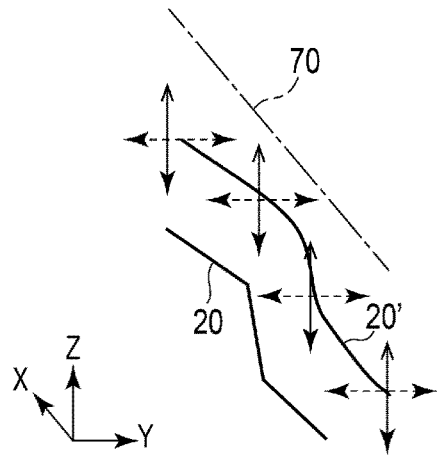
FIG. 10 is a diagram related to a method of correcting a distortion in the exposure device depicted in FIG. 4.

Here, the concept of the exemplary embodiments will be described with reference to FIGS. 8 to 10 while using the exposure device 504 described above as an example. In FIGS. 8 to 10, the light source 51 is represented by a dotted line, the lens mirror array 20 (20') is represented by a solid line, and an image 70 formed on the surface of the photoconductive drum 314 is represented by a one-dot chain line. In addition, in FIGS. 8 to 10, the main scanning direction is represented by an arrow X, the sub-scanning direction is represented by an arrow Y, and a direction orthogonal to a direction X and a direction Y is represented by an arrow Z. Here, the exposure device 504 will be described as a representative. However, the exemplary embodiments can be applied to other optical devices such as the document reading device 10 or the exposure device 210 of the printer 200 described above.

In the related art, inclination of the lens mirror array 20 is adjusted between the light source 51 and the image 70 as shown in FIG. 8 and the lens mirror array 20 is fixed to the case 54 if the lens mirror array 20 is to be attached to the case 54 of the exposure device 504. In this case, the lens mirror array 20 itself is not deformed and only the inclination thereof is adjusted while the linearity thereof is maintained. According to such an adjustment method in the related art, there is a limit to the possible correction of a distortion in an optical device or the lens mirror array 20.

With regard to this, in the exemplary embodiments, if there is a distortion in the light source 51, the lens mirror array 20 is pressed in directions intersecting the main scanning direction at three or more positions in the main scanning direction in accordance with the distortion in the light source 51 such that the lens mirror array 20 is deformed at one or more position (as shown in FIG. 9) and a deviation of the image 70 formed on the surface of the photoconductive drum 314 can be corrected.

Alternatively, as shown in FIG. 10, if there is a positional deviation between the optical elements 21 that are at a joint of the lens mirror arrays 20, that is, if there is a distortion in the lens mirror array 20 itself, the lens mirror array 20 can be deformed in directions intersecting the main scanning direction (state represented by solid line 20') at the position of the distortion to correct the distortion such that the deviation in the image 70 formed on the surface of the photoconductive drum 314 is corrected.

When a correction method of deforming the lens mirror array 20 in this manner is adopted, even if there is a distortion in the light source 51 and there is a distortion in the lens mirror array 20, both of these distortions can be corrected at the same time. In addition, with such a method, it is possible to increase the possible extent of correction of distortion to higher than that in the related art and thus to form a higher-quality image with less deviation than in the related art.

Specifically, in the present embodiment, at the time of manufacture of the exposure device 504, the lens mirror array 20 is deformed in the directions (direction Y and direction Z) intersecting the main scanning direction and the lens mirror array 20 in a deformed state is fixed to the case 54 such that a distortion in an electrostatic latent image or a focus deviation caused by a distortion in the light source 51 or a distortion in the lens mirror array 20 does not occur. A method and a device used to deform the lens mirror array 20 is not limited to that in embodiments described below and, in general, other methods/devices may be adopted.

A distortion in the light source 51 or a distortion in the lens mirror array 20 can be measured by detecting light passing through a lens mirror array 20 that has actually been incorporated into the exposure device 504. However, as described above, a distortion in the light source 51 or the lens mirror array 20 may have a tendency peculiar to the manufacturing device thereof. In such a case, the lens mirror array 20 may be deformed into a shape by which the typical distortion would be removed. Such deformation/correction may be performed in accordance with the known distortion tendency peculiar to the manufacturing device without requiring measurement of distortions for each individual lens mirror array 20 or light source 51. Such corrections of typical or expected distortion may be performed on a lens mirror array 20, when such a lens mirror array 20 is being fixed to the case 54. A manufacturing method of the exposure device 504 based on such distortion correction will be described.

First Embodiment

In the first embodiment, it will be assumed that there is a positional deviation between the plurality of light emitting elements of the light source 51 of the exposure device 504 and there is a distortion in the light source 51 caused by the positional deviation. In addition, it will be assumed that the distortion in the light source 51 has a tendency peculiar to a manufacturing device used for manufacturing the particular light source 51. That is, it will be assumed that distortion occurs at the approximately same position and in the approximately same direction for all of the light sources 51 that are manufactured by the same manufacturing device (hereinafter, such distortions will be referred to as "expected distortions" or "distortion tendencies").

Therefore, in the present embodiment, the lens mirror arrays 20 that are to be combined with the light sources 51 with the same distortion tendencies fixed to the cases 54 can be deformed into shapes such that the expected distortions are canceled out. The lens mirror arrays 20 can be fixed to the cases 54 together with the light sources 51 with the shapes thereof after the deformation being maintained thereafter. That is, in the present embodiment, the lens mirror arrays 20 are deformed into a shape that may be determined in advance since the light sources 51 have distortions with the same tendency (expected distortions).

Hereinafter, a manufacturing method of the exposure device 504 in the present embodiment will be described.

Figure 11:
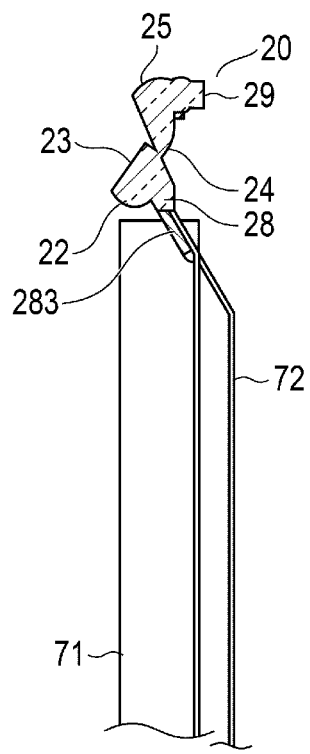
FIG. 11 is a diagram for describing aspects of a first embodiment of a manufacturing method showing a state where the lens mirror array is held by jigs.

First, as shown in FIG. 11, the lens mirror array 20 is held by a plurality of the jigs 71 at a plurality of positions in the longitudinal direction thereof (corresponding to the main scanning direction, which is orthogonal to the page surface in FIG. 11). At this time, the projecting pieces 283 integrally protruding from the flange portion 28 on the incidence side of the lens mirror array 20 are pressed against the jigs 71 by means of the plate springs 72. That is, the projecting pieces 283 of the lens mirror array 20 are nipped by the plurality of jigs 71 and a plurality of the plate springs 72 at a plurality of positions along the main scanning direction. The method of holding the lens mirror array 20 is not limited to using the plurality of jigs 71 and the plurality of plate springs 72 as described above and, in general, any method may be used.

Figure 15:
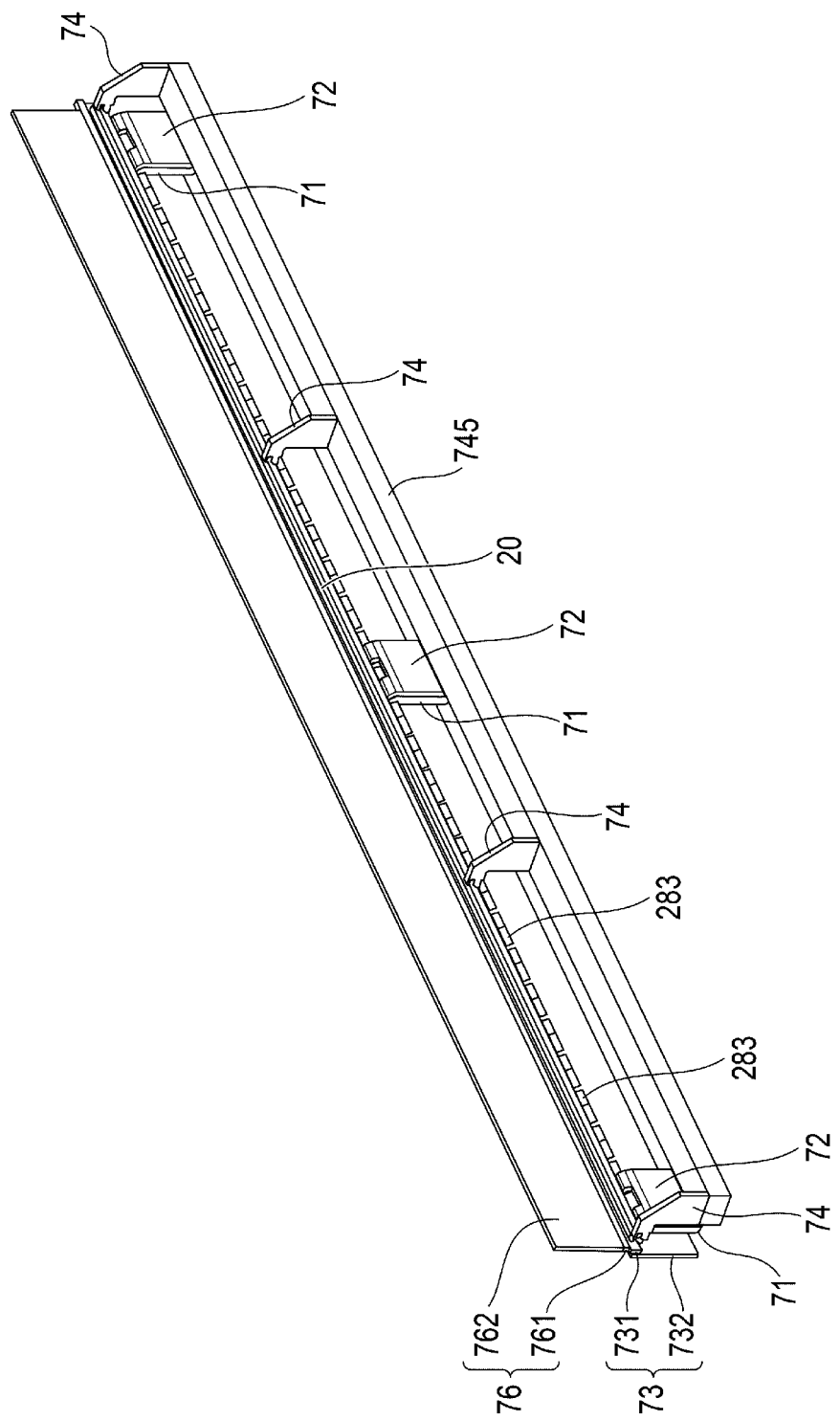
FIG. 15 is an external perspective view showing a state in which the case has been removed.

In the present embodiment, as shown in FIG. 15, the lens mirror array 20 is held by means of three sets of the jigs 71 and the plate springs 72 that are disposed at three positions separated from each other in the longitudinal direction of the lens mirror array 20. However, the number of positions at which the lens mirror array 20 is held is not limited to that in the present embodiment as long as the lens mirror array 20 is held at two or more positions. In addition, the plurality of jigs 71 may be independent of each other as shown in FIG. 15 and may be integrally formed with each other.

A force that noticeably deforms the lens mirror array 20 is not applied from the jigs 71 while the lens mirror array 20 is being held by the plurality of jigs 71 and the plurality of plate springs 72. In other words, the holding force generated by the jigs 71 and the plate springs 72 is not enough to deform the lens mirror array 20. It is desirable that the holding force be weak and not enough to hinder corrective deformation of the lens mirror array 20 applied subsequently. Alternatively, the jigs 71 and the plate springs 72 may be slightly movable when the lens mirror array 20 is being deformed.

Figure 12:
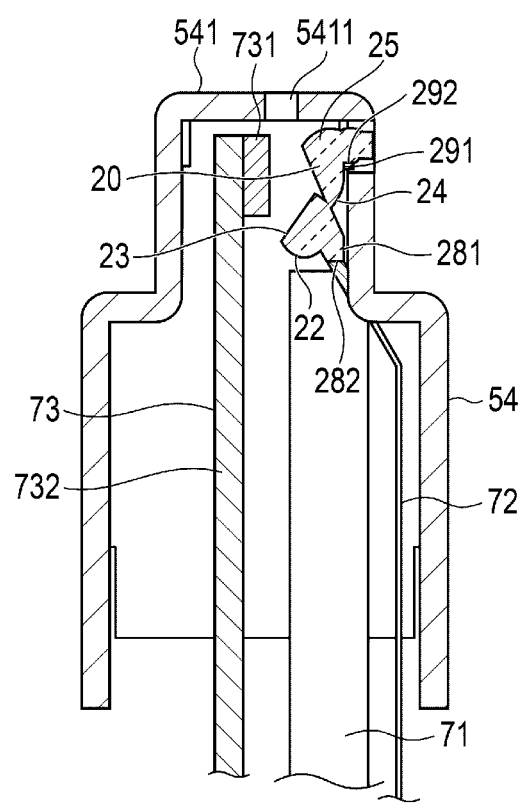
FIG. 12 is a diagram for describing aspects of a first embodiment of a manufacturing method showing a state where a pressing member is disposed to face the lens mirror array, and the pressing member and the lens mirror array are covered with a case.

Next, as shown in FIG. 12, a pressing member 73 is disposed on a side (side facing upstream side reflection surfaces 23 of optical elements 21) left to the lens mirror array 20 held by the plurality of jigs 71 and the plurality of plate springs 72 as seen in the drawing and the lens mirror array 20 and the pressing member 73 are covered by the case 54 such that the case 54 covers the lens mirror array 20 and the pressing member 73 from the outside. At this time, the case 54 is attached while being oriented such that the emission side lens surfaces 25 of the optical elements 21 face the slit 5411 provided in the top wall 541 of the case 54. A mechanism (that covers the lens mirror array 20 and the pressing member 73 with the case 54 positions the case 54 at a predetermined position.

The pressing member 73 includes an elastic member 731 that comes into contact with the lens mirror array 20 to press the abutting surfaces 281 and 291 of the lens mirror array 20 against the reference surfaces 743 of the positioning jigs 74. That is, the pressing member 73 is disposed on a side opposite to the positioning jigs 74 with respect to the lens mirror array 20. The elastic member 731 is a plate-shaped body that has the approximately same length as the lens mirror array 20 and is long in the main scanning direction. In addition, the pressing member 73 includes a plate-shaped member 732 that holds the elastic member 731. The elastic member 731 is attached to one surface side (lens mirror array 20 side) of a tip end of the plate-shaped member 732.

Figure 13:
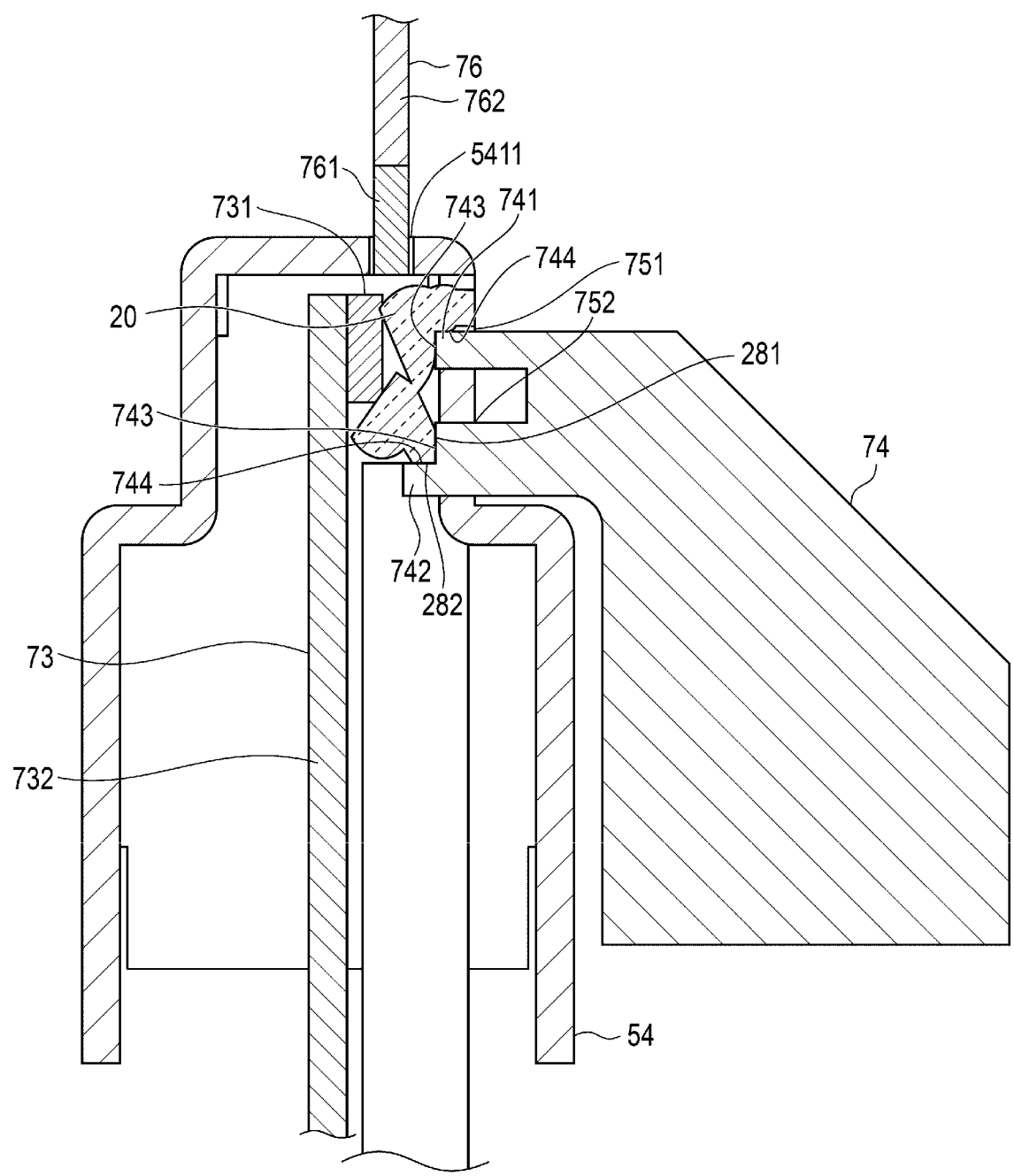
FIG. 13 is a diagram for describing aspects of a first embodiment of a manufacturing method showing a state where positioning pins are inserted via holes of the case and the lens mirror array is deformed by being pressed against the positioning jigs.

After the lens mirror array 20 and the pressing member 73 are covered with the case 54 as shown in FIG. 12, the positioning pins 741 and 742 of a plurality of the positioning jigs 74 are inserted via a plurality of holes 751 and 752 (also referred to as jig insertion holes) in the case 54 from the outside of the case 54 as shown in FIGS. 13 and 14. Another pressing member 76 is inserted via the slit 5411 of the case 54.

As shown in FIGS. 14 and 15, the positioning jigs 74 are disposed at positions near the opposite ends of the lens mirror array 20 in the longitudinal direction and at two positions that are separated from the opposite ends to be close to the center. The positioning jigs 74 do not need to be provided at the positions near the opposite ends of the lens mirror array 20 but can be disposed at any positions along the main scanning direction. In the present embodiment, four positioning jigs 74 are separated from each other at approximately equal intervals in the main scanning direction. Any number of the positioning jigs 74 may be used as long as the number of the positioning jigs 74 is three or more and the positioning jigs 74 are disposed in accordance with positions at which the lens mirror array 20 is to be deformed.

In the present embodiment, the four positioning jigs 74 are integrally provided with a rod-shaped supporting member 745 and the positioning jigs 74 each including the reference surfaces 743 and 744 positionally aligned at predetermined relative positions in advance are used. That is, in the present embodiment, as described above, the disposition positions of the four positioning jigs 74 in the main scanning direction and the disposition positions of the reference surfaces 743 and 744 of each positioning jig 74 are adjusted in advance in accordance with the target shape of the lens mirror arrays 20 after deformation and the four positioning jigs 74 are integrally formed with each other by means of the supporting member 745 so that the lens mirror arrays 20 are deformed into the approximately same shape determined in advance. The positioning jigs 74 do not need to be integrally formed with each other by means of the supporting member 745 as in the present embodiment. A plurality of positioning jigs 74 that are independent of each other may be positioned at predetermined positions.

The holes 751 and 752 of the case 54 into which the positioning pins 741 and 742 of the positioning jigs 74 are inserted are provided to penetrate the upper wall portion 5421 of the side wall 542 on one side (right side in FIG. 12) of the case 54. The number of the holes 751 and 752 and the disposition positions of the holes 751 and 752 are determined in accordance with the number of the positioning jigs 74, the number of the positioning pins 741 and 742 of the positioning jigs 74, and the disposition positions of the positioning pins 741 and 742.

As shown in FIG. 13, the above-described reference surface 743 is provided at a tip end of the positioning pin 741 on one side (upper side in drawing) of each positioning jig 74. In addition, the positioning pin 741 includes the reference surface 744 orthogonal to the reference surface 743. The reference surface 744 is a surface parallel to both of the main scanning direction and the sub-scanning direction. The positioning pin 742 on the other side (lower side in drawing) of each positioning jig 74 includes the reference surface 743 flush with the reference surface 743 of the positioning pin 741. The positioning pin 742 includes the reference surface 744 orthogonal to the reference surface 743. The reference surface 744 is a surface parallel to both of the main scanning direction and the sub-scanning direction. The lens mirror array 20 does not need to come into contact with both of the reference surfaces 744 and, in some instances, the lens mirror array 20 may come into contact with only one of the reference surfaces 744. The reference surfaces 743 are disposed along a plane that is parallel to the main scanning direction and is orthogonal to the sub-scanning direction.

The pressing member 76 includes an elastic member 761 that comes into contact with the emission side lens surfaces 25 of the optical elements 21 of the lens mirror array 20 to press the lens mirror array 20 against the reference surfaces 744 of the positioning jigs 74. The elastic member 761 is a long plate-shaped body that has the approximately same length as the lens mirror array 20. In addition, the pressing member 76 includes a plate-shaped member 762 that holds the elastic member 761. The plate-shaped member 762 has a thickness such that the plate-shaped member 762 can be inserted into the slit 5411 of the case 54 and has a length in the main scanning direction such that the plate-shaped member 762 can be inserted into the slit 5411 of the case 54. The elastic member 761 is attached to a tip end of the plate-shaped member 762.

After the positioning pins 741 and 742 of the positioning jigs 74 are inserted into the holes 751 and 752 of the case 54 and the pressing member 76 is inserted via the slit 5411 of the case 54, the elastic member 731 of the pressing member 73 is pressed against the lens mirror array 20 and the elastic member 761 of the pressing member 76 is pressed against the lens mirror array 20. Such a state is shown in FIG. 13. If the protection glass 214 is disposed between the support 211 and the lens mirror array 220 as in the embodiment shown in FIG. 5, the elastic member 761 of the pressing member 76 is pressed against the protection glass 214 such that the lens mirror array 220 is pressed against one or both of the positioning pins 741 and 742 through the protection glass 214.

A direction in which the elastic member 731 of the pressing member 73 is pressed against the lens mirror array 20 is a direction parallel to the sub-scanning direction and is a direction toward the reference surfaces 743 of the positioning jigs 74. In addition, a direction in which the elastic member 761 of the pressing member 76 is pressed against the lens mirror array 20 is a direction that is orthogonal to the main scanning direction and is orthogonal to the sub-scanning direction. As described above, since the lens mirror array 20 can be pressed in two directions orthogonal to the longitudinal direction thereof at any position in the longitudinal direction of the lens mirror array 20, it is possible to deform the lens mirror array 20 into a desired shape.

When the lens mirror array 20 is pressed in the above-described direction by means of the pressing member 73, the abutting surface 281 of the flange portion 28 on the incidence side of the lens mirror array 20 is pressed against the reference surfaces 743 of the positioning pins 742 and the abutting surface 291 provided between the downstream side reflection surfaces 24 and the flange portion 29 on the emission side is pressed against the reference surfaces 743 of the positioning pins 741. In addition, when the lens mirror array 20 is pressed in the above-described direction by means of the pressing member 76, the abutting surface 282 of the flange portion 28 on the incidence side of the lens mirror array 20 is pressed against the reference surfaces 744 of the positioning pins 742 and the abutting surface 292 of the flange portion 29 on the emission side is pressed against the reference surfaces 744 of the positioning pins 741.

That is, in such a state, the lens mirror array 20 is pressed against the reference surfaces 743 and 744 of the positioning jigs 74 at the positions of the four positioning jigs 74 and is positioned. Since the relative positions of the reference surfaces 743 and 744 of the four positioning jigs 74 are adjusted in advance as described above, the lens mirror array 20 pressed against all of the reference surfaces 743 and 744 is deformed into a shape corresponding to the disposition positions of the reference surfaces 743 and 744 after the adjustment. That is, the lens mirror array 20 is not a rigid body and has a flexibility that allows the lens mirror array 20 to be slightly bent (or otherwise deformed).

Then, the lens mirror array 20 is bonded and fixed to the case 54 while the lens mirror array 20 is in a deformed state, that is, in a state as shown in FIG. 13. At this time, the adhesive S is applied between the lens mirror array 20 and the case 54 via a plurality of holes 753 and 754, which are provided at different positions from the holes 751 and 752 into which the positioning pins 741 and 742 are inserted, such that the lens mirror array 20 is bonded and fixed to the case 54. In some examples, the plurality of jigs 71 and the plurality of plate springs 72 holding the lens mirror array 20 may be removed before the lens mirror array 20 is bonded and fixed.

Over approximately the entire length of the lens mirror array 20, the plurality of holes 753 are provided at positions facing the flange portion 29 on the emission side that are separated from each other in the main scanning direction and the holes 753 are provided to penetrate the upper wall portion 5421 of the case 54. In addition, the adhesive S can be applied via all or just some of the plurality of holes 753 such that the flange portion 29 of the lens mirror array 20 is bonded and fixed to the case 54 at a plurality of positions in the main scanning direction. If the jigs 71 and the plate springs 72 are not yet removed, it is necessary to apply the adhesive S after selecting the holes 753 that do not face the jigs 71 and the plate springs 72.

Over approximately the entire length of the lens mirror array 20, the plurality of holes 754 are provided at positions facing the projecting pieces 283 on the incidence side that are separated from each other in the main scanning direction. The holes 754 are provided to penetrate the upper wall portion 5421 of the case 54. The adhesive S can be applied via all or just some of the plurality of holes 754 such that the projecting pieces 283 of the flange portion 28 are bonded and fixed to the case 54 at a plurality of positions along the main scanning direction. If the jigs 71 and the plate springs 72 are not yet removed, it is necessary to apply the adhesive S after selecting the holes 754 that do not face the jigs 71 and the plate springs 72.

After the adhesive S is cured, that is, after the lens mirror array 20 in a deformed state has been fixed to the case 54, the pressing member 73 is caused to stop pressing the lens mirror array 20, the pressing member 73 is then removed from the inside of the case 54. Likewise, the pressing member 76 is caused to stop pressing the lens mirror array 20, and the pressing member 76 is extracted from the slit 5411. Furthermore, the positioning pins 741 and 742 of the positioning jigs 74 are extracted from the holes 751 and 752. If the jigs 71 and the plate springs 72 have not yet been removed until this point in time, the jigs 71 and the plate springs 72 can now also be removed.

Thereafter, as shown in FIG. 4, the light source unit 52 is placed in the containing space 5432 of the case 54, positioned with respect to the lens mirror array 20, and then bonded and fixed to the case 54. In this instance, the light source unit 52 is positioned with respect to the lens mirror array 20 instead of being positioned with respect to the case 54. The adhesive S is applied between outer surfaces of the side walls 532 of the holder 53 of the light source unit 52 and inner surfaces of the lower wall portions 5423 of the case 54. With the light source unit 52 fixed to the case 54, the light source unit 52 may be installed in a posture in which no image distortion occurs when the light source 51 is caused to emit light and the light is concentrated by the lens mirror array 20.

As described above, according to the present embodiment, even if there is a distortion in the light source 51 of the exposure device 504, it is possible to correct deviation of light passing through the plurality of optical elements 21 and to correct a distortion in an optical system of the exposure device 504 by correctively deforming the lens mirror array 20. In addition, similarly, according to the present embodiment, even if there is a distortion in the lens mirror array 20, it is possible to correct such distortion as long as the lens mirror array 20 can be deformed in a direction and extent necessary to cancel out the distortion. In addition, even if there is a distortion in both of the light source 51 and the lens mirror array 20, it is usually possible to correct these distortions by deforming just the lens mirror array 20. Furthermore, according to the present embodiment, since it is possible to deform the lens mirror array 20 into a desired shape by adjusting the disposition positions of the plurality of positioning jigs 74 along the main scanning direction or the relative positions of the reference surfaces 743 and 744 of the positioning pins 741 and 742, it is possible to increase the possible extent of distortion correction.

The description in the above-described embodiment is based on the assumption that distortion of the light sources 51 have a tendency peculiar to the manufacturing device used to fabricate the light sources 51. However, in other examples, a distortion of a light source 51 may be measured by using another device. Such measurements may be performed individually on each light source 51. As such, the lens mirror array 20 may be deformed into a shape to cancel out the individually measured distortion of each particular light source 51. A specifically deformed lens mirror array 20 and the corresponding light source 51 may be combined with each other, and the lens mirror array 20 and the light source 51 may be positioned and fixed to the case 54 to maintain the corrective arrangement. The same applies to the following embodiments.

Second Embodiment

Hereinafter, a second embodiment of a manufacturing method of the exposure device 504 will be described with reference to FIGS. 16 to 21. Here, the same components as those in the above-described first embodiment will be given the same reference numerals and description on the details thereof will be omitted.

Figure 21:
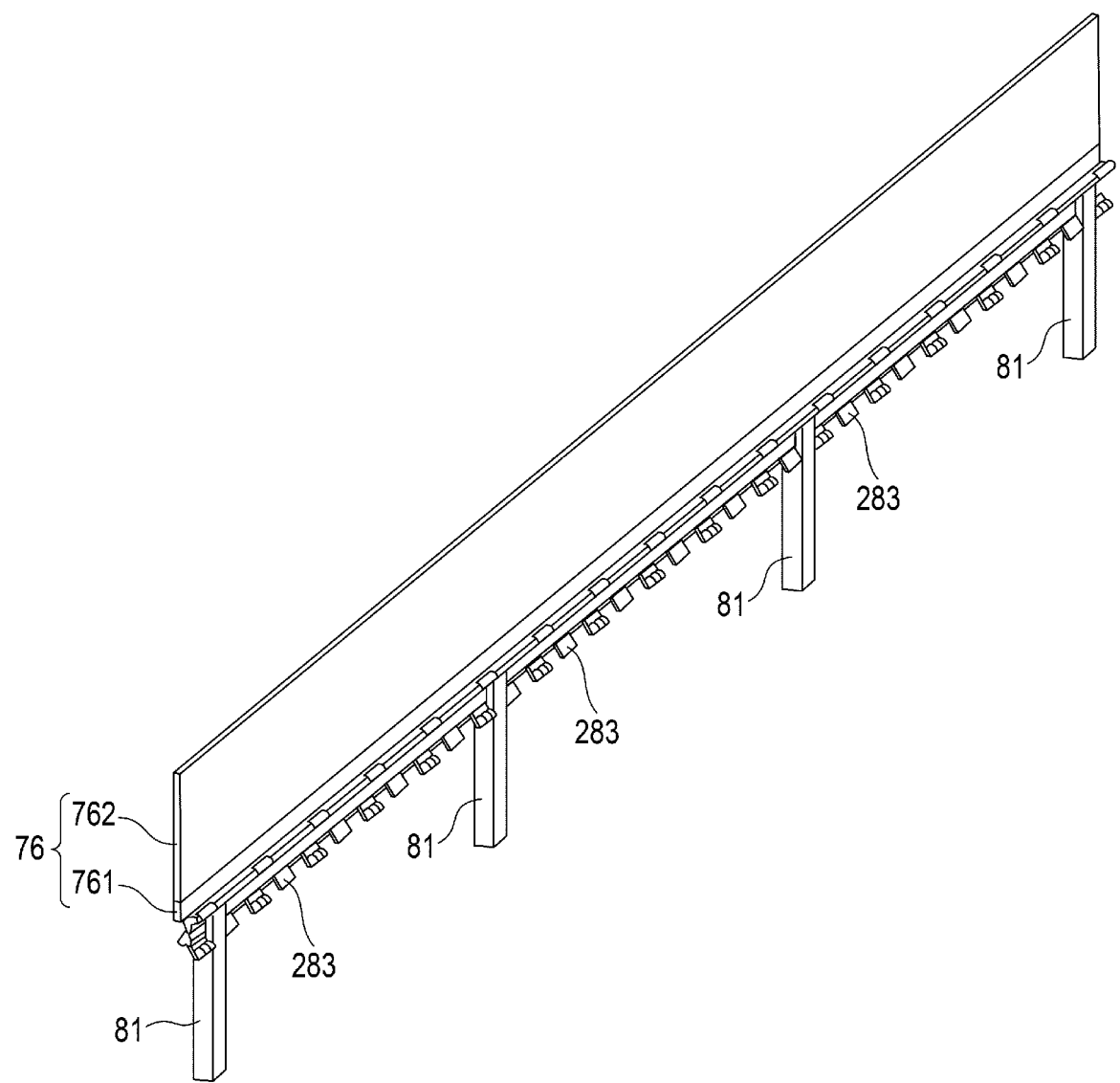
FIG. 21 is an external perspective view showing a state in which the case has been removed.

First, a plurality of positioning jigs 81 are disposed at a plurality (four in present embodiment) of positions separated from each other in the longitudinal direction of the lens mirror array 20. As shown in FIG. 21, in the present embodiment, two positioning jigs 81 are disposed at positions near the opposite ends of the lens mirror array 20 in the longitudinal direction and two positioning jigs 81 are disposed at two positions separated from each other between the opposite ends. That is, in the present embodiment, four positioning jigs 81 are disposed at approximately equal intervals along the longitudinal direction of the lens mirror array 20. Each of the positioning jigs 81 extends in a direction that is orthogonal to the main scanning direction and orthogonal to the sub-scanning direction and supports the lens mirror array 20 at an upper end as seen in the drawing.

Figure 16:
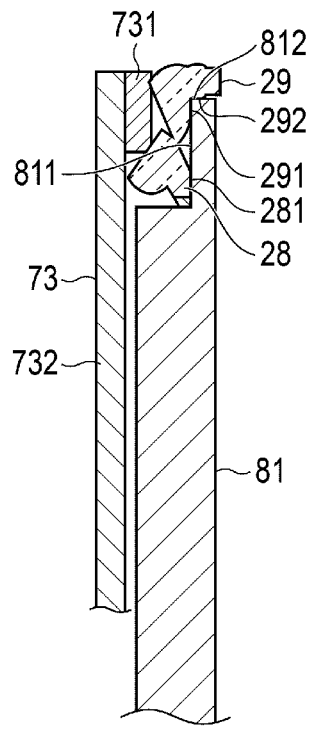
FIG. 16 is a diagram for describing a second embodiment of a manufacturing method of the optical device depicted in FIG. 4 showing a state where the lens mirror array is held by a plurality of jigs.

As shown in FIG. 16, the positioning jigs 81 include flat reference surfaces 812 that come into surface-contact with the abutting surface 292 provided at a surface of the flange portion 29 on the emission side of each optical element 21 of the lens mirror array 20. The reference surface 812 is provided at an upper end surface of each positioning jig 81 as seen in the drawing. In addition, the positioning jigs 81 include flat reference surfaces 811 that come into surface-contact with the abutting surface 291 provided between the downstream side reflection sur face 24 of each optical element 21 of the lens mirror array 20 and the flange portion 29 on the emission side. The reference surfaces 811 are surfaces that come into surface-contact with the abutting surface 281 provided at a surface of the flange portion 28 on the incidence side of each optical element 21 of the lens mirror array 20. The reference surfaces 811 of the positioning jigs 81 are surfaces that are parallel to the main scanning direction and are orthogonal to the sub-scanning direction. In addition, the reference surfaces 812 of the positioning jigs 81 are surfaces that are parallel to the main scanning direction and parallel to the sub-scanning direction and are surfaces that are orthogonal to the reference surfaces 811.

The four positioning jigs 81 in the present embodiment are integrated with each other by means of a supporting member with the reference surfaces 811 and 812 positionally aligned relative to each other. For example, if there are distortions having the same tendency peculiar to the manufacturing device in the light sources 51, the reference surfaces 811 and 812 of each positioning jig 81 can be disposed at positions such that the lens mirror arrays is deformed into a shape correcting these distortions. Alternatively, the four positioning jigs 81 may be provided such that the positioning jigs 81 can be moved in a direction orthogonal to the main scanning direction independently of each other by a driving mechanism.

Next, the abutting surfaces 281 and 291 of each optical element 21 of the lens mirror array 20 are caused to face the reference surface 811 of each positioning jig 81 and the abutting surface 292 of each optical element 21 of the lens mirror array 20 is caused to face the reference surface 812 of each positioning jig 81. Then, the pressing member 73 is disposed on a side opposite to the positioning jigs 81 with respect to the lens mirror array 20 and the elastic member 731 of the pressing member 73 is pressed against the lens mirror array 20. At this time, a direction in which the elastic member 731 is pressed is the sub-scanning direction. Accordingly, the lens mirror array 20 is deformed by being pressed in the sub-scanning direction at four positions at which the positioning jigs 81 are disposed and the abutting surfaces 281 and 291 of the lens mirror array 20 are positioned by being brought into contact with the reference surfaces 811 of the positioning jigs 81. Such a state is shown in FIG. 16.

Figure 17:
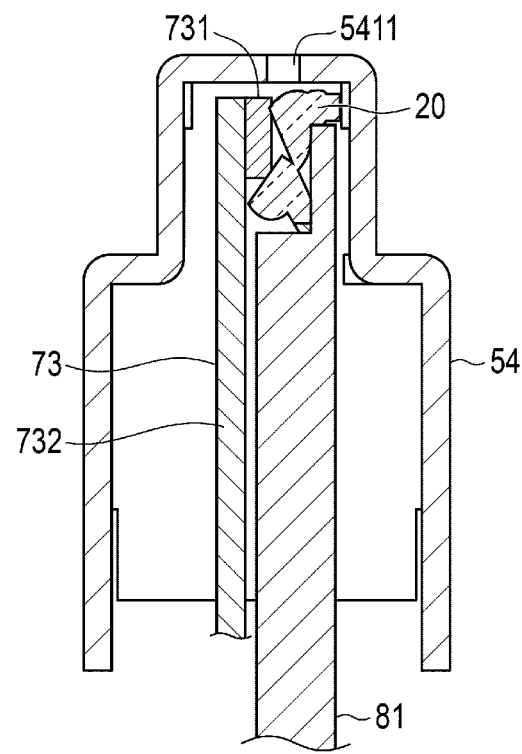
FIG. 17 is a diagram for describing a second embodiment of a manufacturing method showing a state where an assembly depicted in FIG. 16 is covered with the case.
Figure 18:
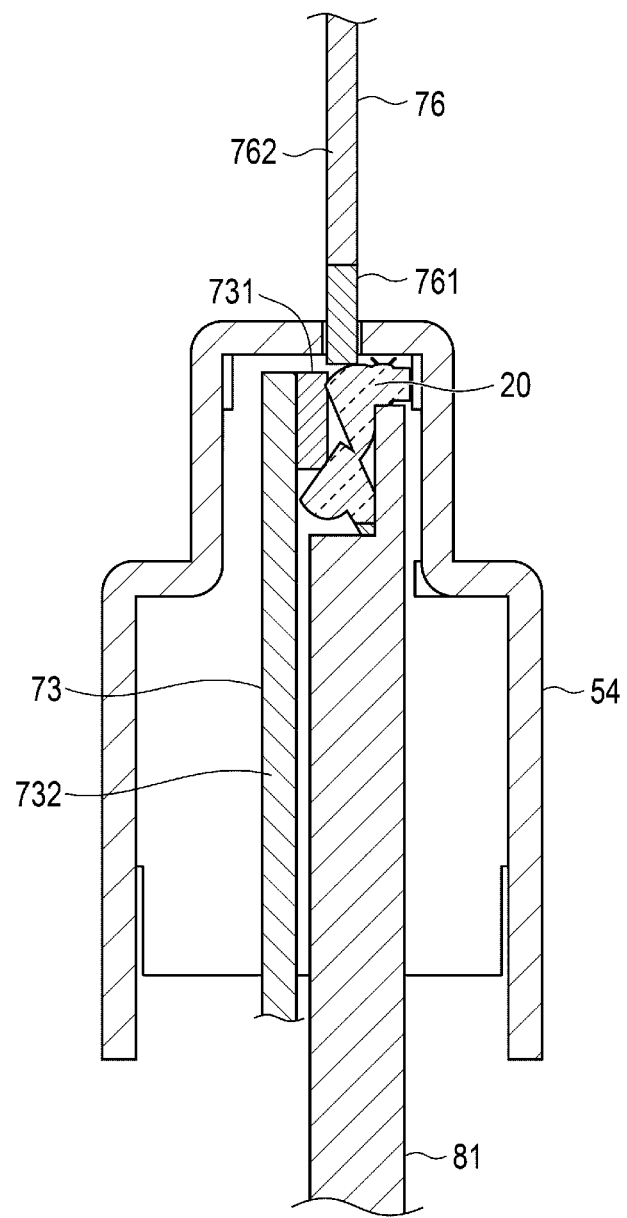
FIG. 18 is a diagram for describing a second embodiment of a manufacturing method showing a state where a pressing member is inserted via a slit of the case.
Figure 19:
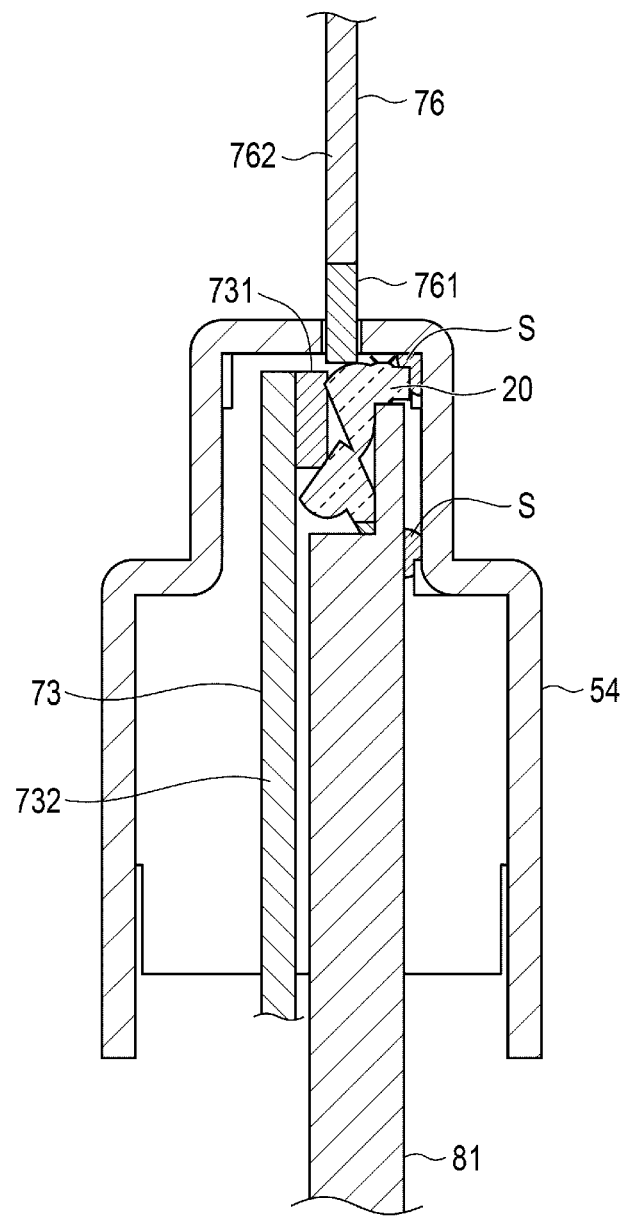
FIG. 19 is a diagram for describing a second embodiment of a manufacturing method showing a state where the lens mirror array is fixed to the case by means of an adhesive.
Figure 20:
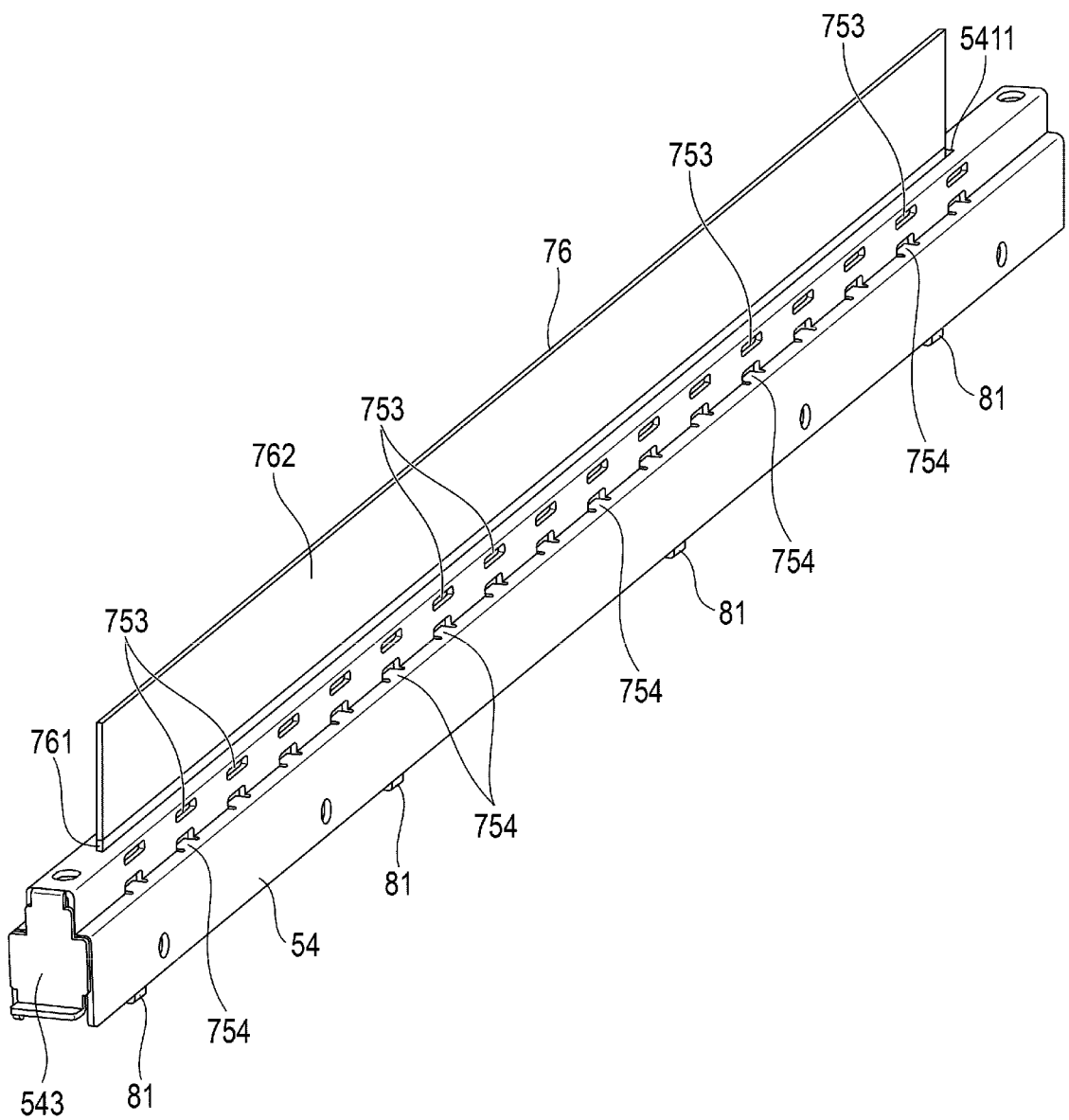
FIG. 20 is an external perspective view corresponding to FIG. 18.

Furthermore, the case 54 that covers the lens mirror array 20 and the pressing member 73 is attached as shown in FIG. 17 and another pressing member 76 is inserted into the slit 5411 of the case 54 as shown in FIG. 18. Then, the elastic member 761 of the pressing member 76 is pressed against the lens mirror array 20 and the lens mirror array 20 is urged in a direction orthogonal to both of the main scanning direction and the sub-scanning direction at the positions of the positioning jigs 81. Accordingly, the lens mirror array 20 is deformed at the positions of the positioning jigs 81 and the abutting surface 292 of the lens mirror array 20 is positioned by being brought into contact with the reference surfaces 812 of the positioning jigs 81. Such a state is shown in FIGS. 18 and 20. If the protection glass 214 is disposed between the support 211 and the lens mirror array 220 as in the embodiment shown in FIG. 5, the elastic member 761 of the pressing member 76 is pressed against the protection glass 214 such that the lens mirror array 220 is pressed against the positioning jigs 81 through the protection glass 214.

Next, while the lens mirror array 20 is displaced in a predetermined direction orthogonal to the main scanning direction at the positions of the positioning jigs 81, as shown in FIG. 18, the adhesive S can be applied via the holes 753 and 754 (see FIG. 20) in the case 54. That is, the adhesive S is applied between the flange portion 29 on the emission side of the lens mirror array 20 and the case 54 via the holes 753. The adhesive S is also applied between the projecting pieces 283 of the flange portion 28 on the incidence side of the lens mirror array 20 and the case 54 via the holes 754.

Thereafter, when the adhesive is cured and the lens mirror array 20 in a deformed state has been fixed to the case 54, the pressing members 73 and 76 are caused to stop pressing the lens mirror array 20, then removed. The light source unit 52 is then bonded and fixed while being positioned at a predetermined position in the case 54 as with the above-described first embodiment.

As described above, according to the present embodiment, as with the above-described first embodiment, it is possible to correct one or both of a distortion in the light source 51 and a distortion in the lens mirror array 20. In addition, according to the present embodiment, unlike the above-described first embodiment, the holes 751 and 752 for insertion of the positioning pins 741 and 742 of the positioning jigs 74 are not necessary. Therefore, since the holes 751 and 752 are not provided, the mechanical strength of the case 54 can be made high.

Third Embodiment

Hereinafter, a third embodiment of a manufacturing method of the exposure device 504 will be described with reference to FIGS. 22 to 28. Here, the same components as those in the above-described first and second embodiments will be given the same reference numerals and description on the details thereof will be omitted.

Figure 22:
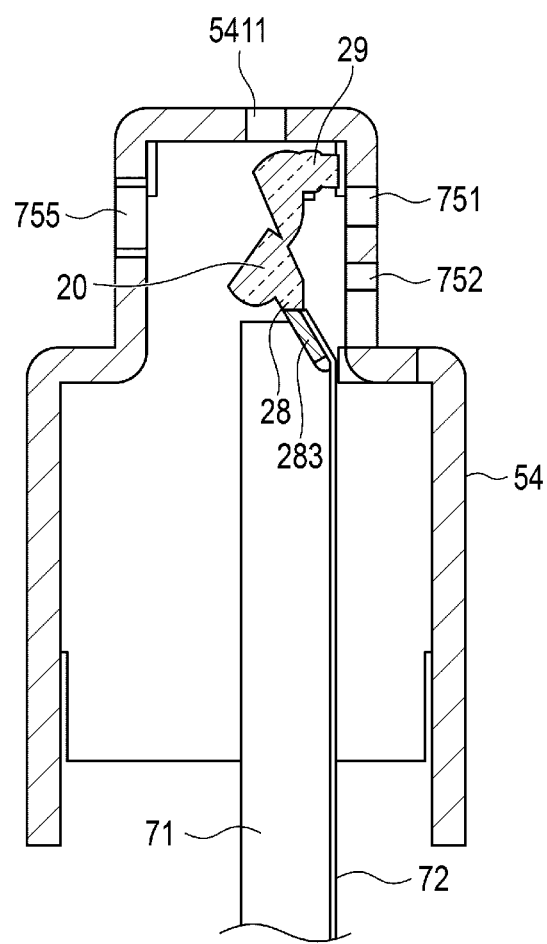
FIG. 22 is a diagram for describing a third embodiment of a manufacturing method of the optical device depicted in FIG. 4 showing a state where the lens mirror array is held by jigs and is covered with a case.

First, as shown in FIG. 22, the projecting pieces 283 of the lens mirror array 20 are nipped by means of the plurality of jigs 71 and the plurality of plate springs 72 at a plurality of positions along the main scanning direction and the assembly is then covered with the case 54. At this time, the orientations of the lens mirror array 20 and the case 54 are the same as those in the first and second embodiments described above.

Figure 23:
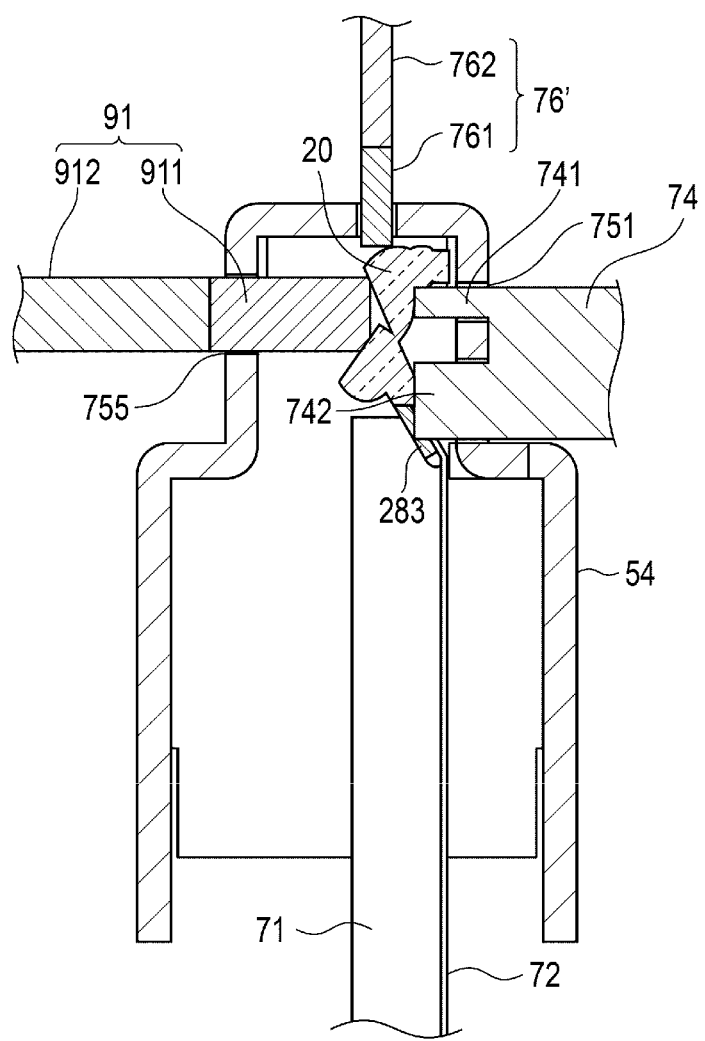
FIG. 23 is a diagram for describing a third embodiment of a manufacturing method showing a state where positioning pins and pressing members are inserted into holes of the case.
Figure 24:
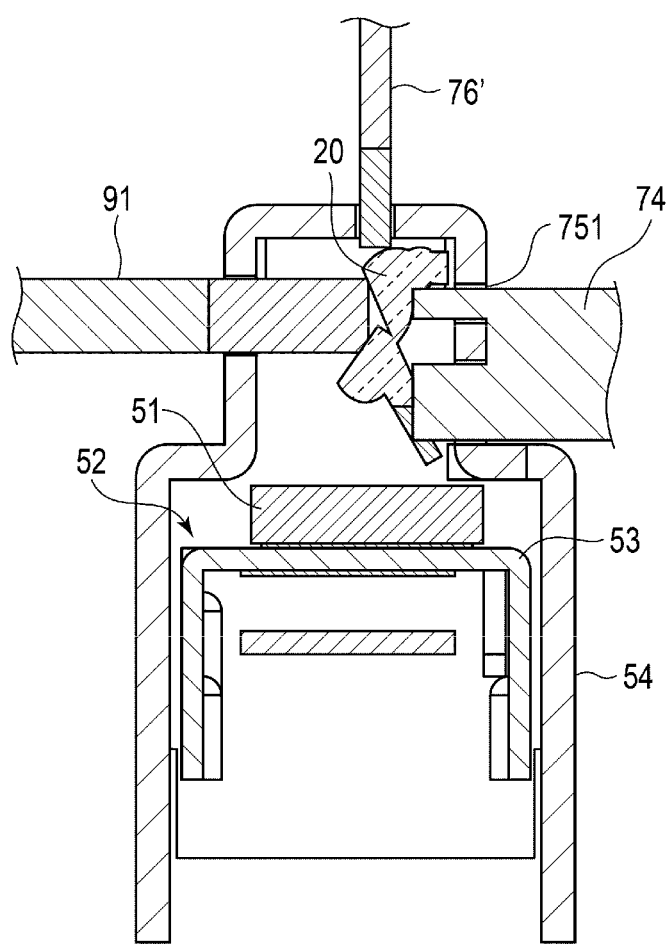
FIG. 24 is a diagram for describing a third embodiment of a manufacturing method showing a state where the jigs are removed and a light source unit is attached.
Figure 27:
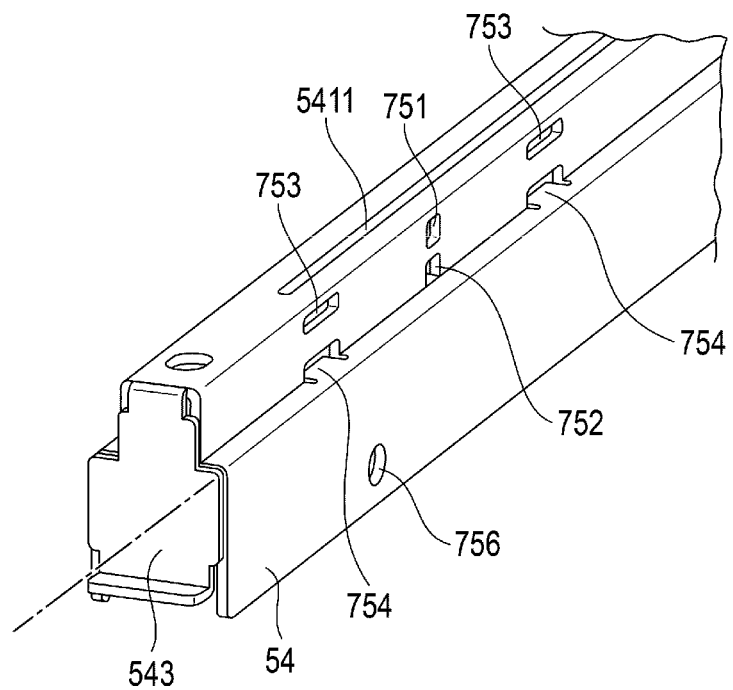
FIG. 27 is an external perspective view of the case depicted in FIG. 22.
Figure 28:
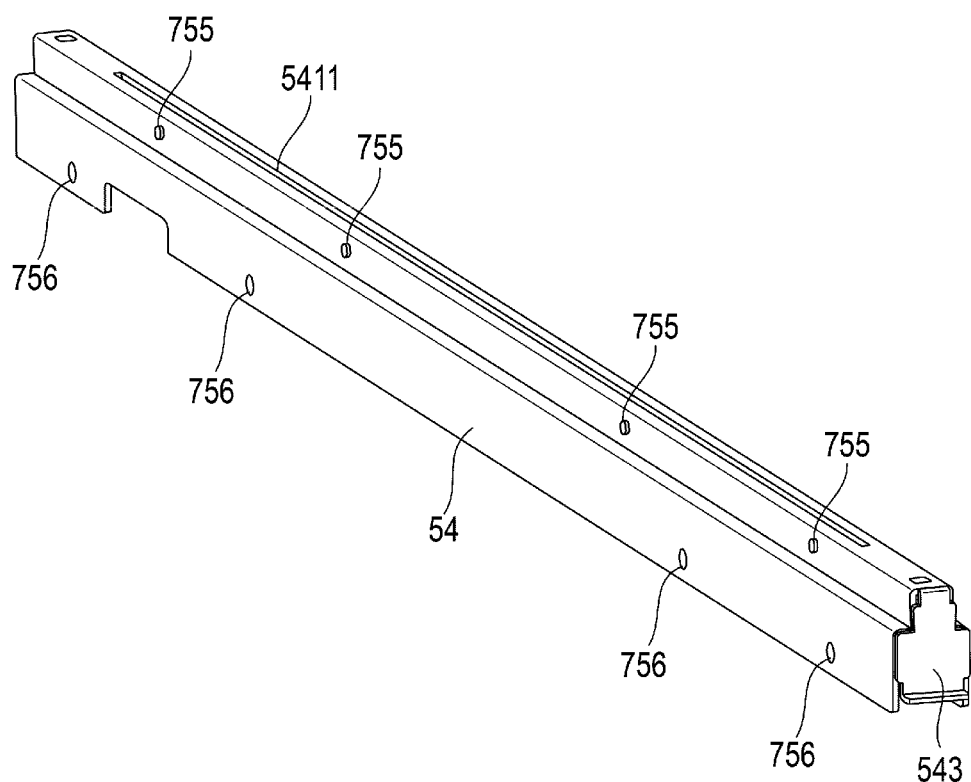
FIG. 28 is an external perspective view of the case depicted in FIG. 22.

As shown in FIG. 27, the case 54 includes the plurality of holes 751 and 752 for insertion of the positioning pins 741 and 742 of the plurality of positioning jigs 74 and the plurality of holes 753 and 754 and the slit 5411 for application of the adhesive S. In addition to those described above, as shown in FIG. 28, the case 54 includes a plurality of holes 755 for insertion of a plurality of pressing members 91 (FIG. 23). The holes 755 are provided at positions facing the holes 751 and 752 for insertion of the positioning pins 741 and 742 in the sub-scanning direction. Although only four holes 755 are shown in FIG. 28, five or more holes 755 may be provided along the main scanning direction. In any case, the holes 755 need to be provided at positions facing at least the positioning jigs 74.

Next, as shown in FIG. 23, the positioning pins 741 and 742 of the plurality of positioning jigs 74 are inserted via the holes 751 and 752 of the case 54, a plurality of pressing members 76' are inserted via the slit 5411 of the case 54, and the plurality of pressing members 91 are inserted via the holes 755 of the case 54. The pressing members 76' function in the same manner as the pressing member 76 in the first and second embodiments. In the present embodiment, it is necessary to detect light passing through the lens mirror array 20. Therefore, the plurality of pressing members 76' are disposed along the slit 5411.

Figure 26:
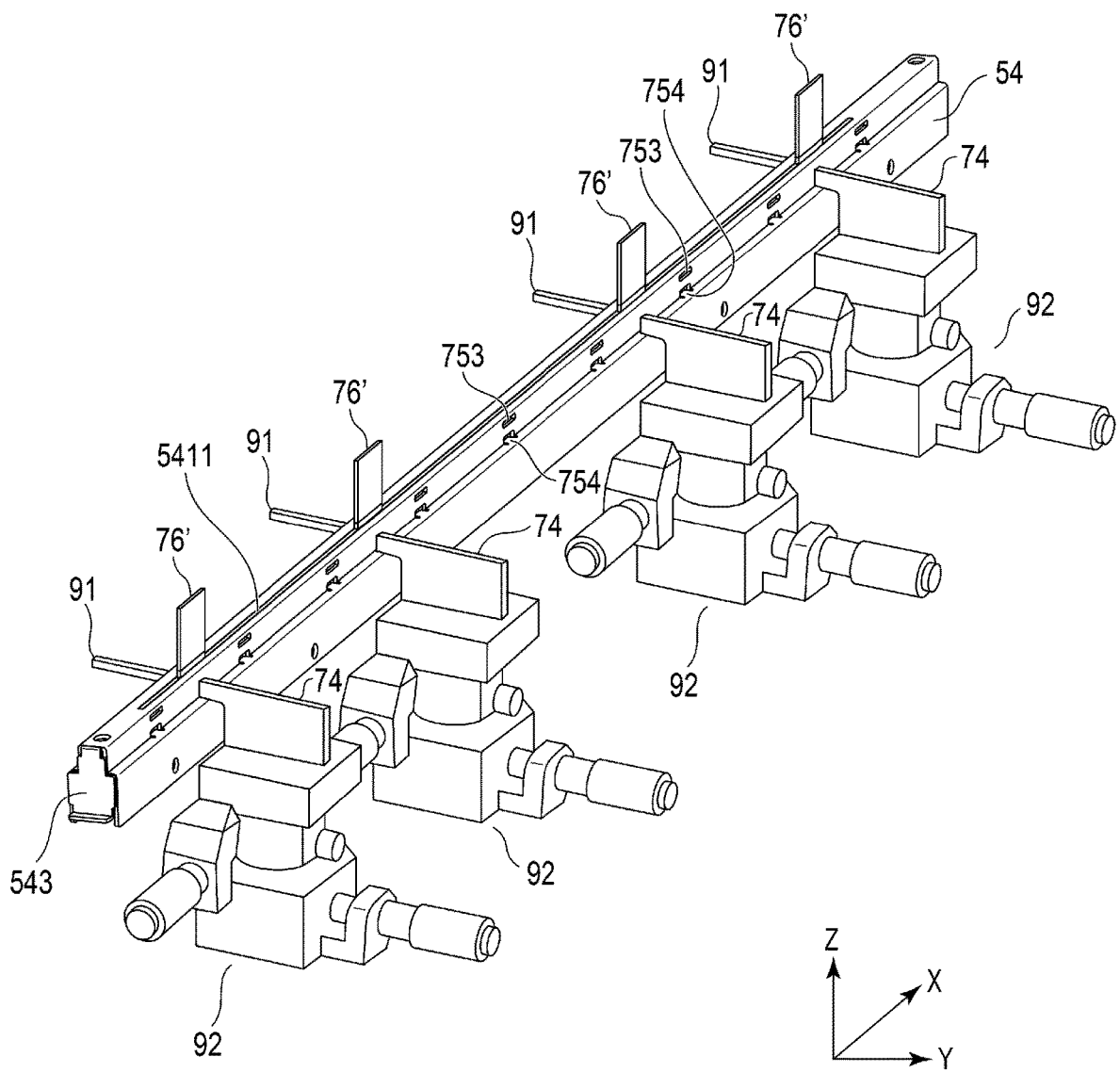
FIG. 26 is an external perspective view corresponding to FIG. 23.

Then, the lens mirror array 20 is pressed by means of elastic members 911 of the plurality of pressing members 91 such that the abutting surfaces 281 and 291 of the lens mirror array 20 are pressed against the reference surfaces 743 of the positioning pins 741 and 742. In addition, the lens mirror array 20 is pressed by the plurality of pressing members 76' such that the abutting surfaces 282 and 292 of the lens mirror array 20 are pressed against the reference surfaces 744 of the positioning pins 741 and 742. Such a state is shown in FIGS. 23 and 26. If the protection glass 214 is disposed between the support 211 and the lens mirror array 220 as in the embodiment shown in FIG. 5, the elastic members 761 of the pressing members 76' are pressed against the protection glass 214 such that the lens mirror array 220 is pressed against the positioning jigs 74 through the protection glass 214.

As shown in FIG. 26, a plurality of moving mechanisms 92 support the plurality of positioning jigs 74. That is, the positioning jigs 74 are movable independently of each other unlike the above-described in the first embodiment. Directions in which each positioning jig 74 moves are directions orthogonal to the main scanning direction (direction along arrow X in drawing) and are the sub-scanning direction (direction along arrow Y in drawing) and a direction (direction along arrow Z in drawing) orthogonal to both of the main scanning direction and the sub-scanning direction.

In the state shown in FIGS. 23 and 26, the lens mirror array 20 has been lightly nipped (pinched) at multiple positions along the main scanning direction between the positioning jigs 74 on one side and the pressing members 91 on the other side. In this state, the movement of the lens array mirror 20 is restricted. That is, in this state, the lens mirror array 20 has not necessarily been pressed sufficiently to be deformed in a corrective manner. Therefore, for example, the reference surfaces 743 of the positioning jigs 74 may be disposed on the same plane as each other and, likewise, the reference surfaces 744 of the positioning jigs 74 may be disposed on the same plane as each other.

Next, restriction of the movement of the plurality of projecting pieces 283 caused by the plurality of jigs 71 and the plurality of plate springs 72 nipping the plurality of projecting pieces 283 of the lens mirror array 20 is removed and the plurality of jigs 71 and the plurality of plate springs 72 are removed from the inside of the case 54. In this state, the lens mirror array 20 is being held by the plurality of positioning jigs 74, the plurality of pressing members 76', and the plurality of pressing members 91. Then, the light source unit 52 is placed in the containing space 5432.

In this state (the state depicted in FIG. 24), the light source 51 can be caused to emit light, this emitted light is then concentrated by the lens mirror array 20. The deviation of an image thus formed can be measured through detection of light at an image plane. The light source unit 52 can be moved in a direction orthogonal to the main scanning direction by means of a moving mechanism such that the deviation of the image is removed or reduced. The plurality of positioning jigs 74 can be moved independently of each other in a direction orthogonal to the main scanning direction such that the lens mirror array 20 is deformed into an appropriate shape to remove or reduce the deviation of the image.

In this process, each of the pressing members 76' and the pressing members 91 can be continuously urged in the direction in which the lens mirror array 20 is pressed, such that the pressing members 76' and the pressing members 91 are moved in accordance with movement of the positioning jigs 74. In other words, the plurality of pressing members 76' and the plurality of pressing members 91 are moved to press the lens mirror array 20 continuously against the reference surfaces 743 and 744 of the positioning jigs 74 without hindering the movement of the plurality of positioning jigs 74.

Figure 25:
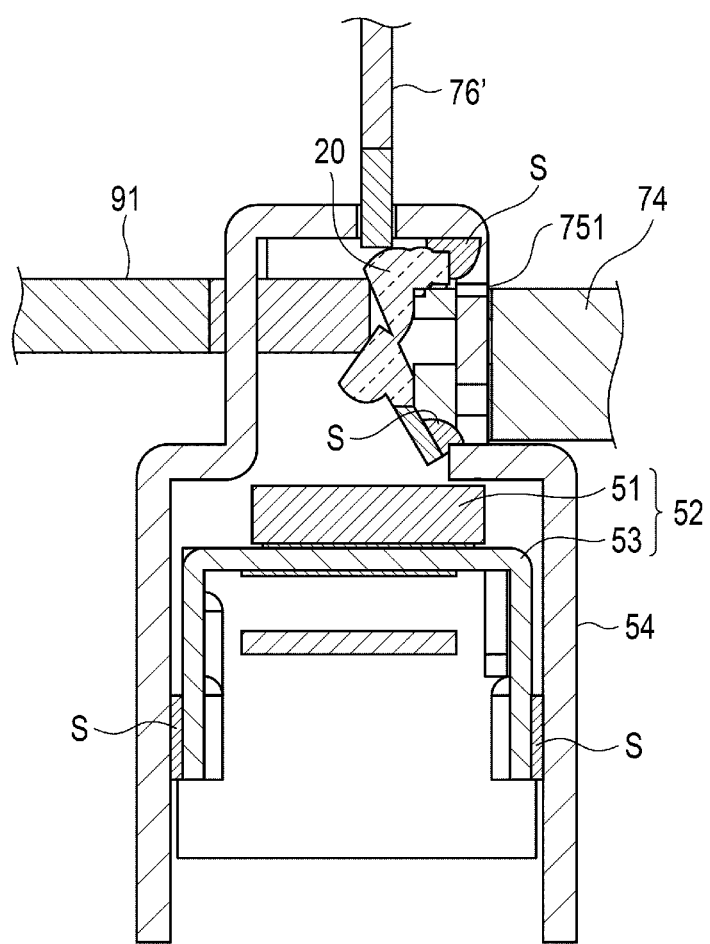
FIG. 25 is a diagram for describing a third embodiment of a manufacturing method showing a state where the lens mirror array is fixed to the case by means of an adhesive.

Thereafter, as shown in FIG. 25, the adhesive S can be applied via the plurality of holes 753 and 754 (see FIG. 26) in the case 54. The adhesive S can also be applied via a plurality of holes 756 (see FIGS. 27 and 28) in the case 54. That is, the adhesive S can be applied between the flange portion 29 on the emission side of the lens mirror array 20 and the case 54 via the plurality of holes 753. The adhesive S can also be applied between the projecting pieces 283 of the flange portion 28 on the incidence side of the lens mirror array 20 and the case 54 via the plurality of holes 754. Furthermore, the adhesive S can also be applied between the holder 53 and the case 54 via the plurality of holes 756.

Thereafter, the adhesive S is cured, thus the lens mirror array 20 in its deformed (corrected) state is fixed to the case 54 and the light source unit 52 is fixed to the case 54. After curing of the adhesive D, the plurality of pressing members 76 and 91 are caused to stop pressing against the lens mirror array 20. The plurality of pressing members 76 and 91 are then removed, and the positioning pins 741 and 742 of the plurality of positioning jigs 74 are also removed.

As described above, according to the present embodiment, as with the above-described first and second embodiments, it is possible to correct one or both of distortion in the light source 51 and distortion in the lens mirror array 20. In addition, according to the present embodiment, it is possible to detect the light actually concentrated by the lens mirror array 20 after the lens mirror array 20 and the light source unit 52 have been incorporated into the case 54 to measure an actual deviation in an image, and then to deform the lens mirror array 20 such that the measured or otherwise observed deviation is corrected. Therefore, it is possible to individually correct distortions of the light source 51 or the lens mirror array 20 and to increase the accuracy of deviation correction.

In the above-described embodiments, a case where the lens mirror array 20 is deformed by being pressed in a direction orthogonal to the longitudinal direction at four positions separated from each other in the longitudinal direction of the lens mirror array 20 was described. However, the exemplary embodiments are not limited thereto and the number of positions along the longitudinal direction at which the lens mirror array 20 is pressed can be set to any number as of three or more. That is, the lens mirror array 20 only has to be supported at both sides of one position, at which the lens mirror array 20 is to be deformed in a direction orthogonal to the main scanning direction, in the main scanning direction and be pressed in the direction orthogonal to the main scanning direction at the position at which the lens mirror array 20 is to be deformed.

In addition, in an above-described embodiment, holes 751 and 752 for insertion of the positioning pins 741 and 742 of the positioning jigs 74 are provided separately from the plurality of holes 753 and 754 for application of the adhesive S. However, the exemplary embodiments are not limited thereto and any of the plurality of holes 753 and 754 for application of the adhesive S may also function as the holes 751 and 752 for insertion of the positioning pins 741 and 742.

Furthermore, in an above-described embodiment, a plurality of positioning jigs 74 are separated from each other along the main scanning direction or the pressing members 73, 76, and 91 are used as means for deforming the lens mirror array 20. However, the exemplary embodiments are not limited thereto and another actuator or the like for holding and bending the lens mirror array 20 may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An optical device, comprising:
a lens mirror array including a plurality of transparent optical elements connected to each other along a first direction;

a case in which the lens mirror array is contained, the lens mirror array being fixed to the case, the case including jig insertion holes through which a manufacturing jig can pass, the jig insertion holes being spaced from each other in the first direction; and a light source comprising a plurality of light emitting elements inside the case and positioned to emit light towards the lens mirror array, wherein the case includes at least three jig insertion holes through which the manufacturing jig can pass, the jig insertion holes permit portions of the manufacturing jig to press the lens mirror array in a direction intersecting the first direction to deform the lens mirror array, and the lens array mirror has been deformed to compensate for a distortion in the light source.

2. The optical device according to claim 1, further comprising:

a plurality of light receiving elements inside the case and positioned to receive light from the lens mirror array.

3. The optical device according to claim 2, wherein the lens array mirror has been additionally deformed to compensate for a positional error of the plurality of light receiving elements.

4. The optical device according to claim 1, wherein the transparent optical elements in the plurality of transparent optical elements are directly joined to an adjacent one of the plurality of transparent optical elements.

5. The optical device according to claim 1, wherein the case further comprises holes positioned to permit an adhesive to be supplied between the case and a fixing portion of the lens mirror array.

6. A method of manufacturing an optical device, the method comprising:

placing a lens mirror array in a case, the lens mirror array comprising a plurality of transparent optical elements connected to each other along a first direction, the case including jig insertion holes through which a manufacturing jig can pass, the jig insertion holes being spaced from each other in the first direction;

while the lens mirror array is in the case, deforming the lens mirror array to compensate for a distortion in the optical device by pressing on the lens mirror array by passing portions of the manufacturing jig through the jig insertion holes;

while the lens mirror array is being deformed to compensate for the distortion, fixing the lens mirror array to case with an adhesive; and placing a light source comprising a plurality of light emitting elements inside the case, wherein the case includes at least three jig insertion holes, the lens mirror array is pressed by portions of the jig at three or more positions to compensate for the distortion, the light source is positioned to emit light towards the lens mirror array, and the distortion is caused by the light source.

7. The method according to claim 6, further comprising: measuring a distortion caused by the light source before placing the light source in the case.

8. The method according to claim 6, further comprising: measuring a distortion caused by the light source after placing the light source in the case but before deforming the lens mirror array.

9. The method according to claim 6, further comprising: placing a plurality of light receiving elements inside the case, wherein the plurality of light receiving elements is positioned to receive light from the lens mirror array.

10. The method according to claim 9, wherein the distortion is additionally caused by the plurality of light receiving elements.

11. The method according to claim 9, further comprising: measuring a distortion caused by the plurality of light receiving elements before placing the plurality of light receiving elements in the case.

12. The method according to claim 9, further comprising: measuring a distortion caused by the plurality of light receiving elements after placing the plurality of light receiving elements in the case but before deforming the lens mirror array.

13. A method of manufacturing an optical device, the method comprising:

placing a lens mirror array in a case, the lens mirror array comprising a plurality of transparent optical elements connected to each other along a first direction, the case including jig insertion holes through which a manufacturing jig can pass, the jig insertion holes being spaced from each other in the first direction;

while the lens mirror array is in the case, deforming the lens mirror array to compensate for a distortion in the optical device by pressing on the lens mirror array by passing portions of the manufacturing jig through the jig insertion holes;

while the lens mirror array is being deformed to compensate for the distortion, fixing the lens mirror array to case with an adhesive; and placing a plurality of light receiving elements inside the case, wherein the case includes at least three jig insertion holes, the lens mirror array is pressed by portions of the jig at three or more positions to compensate for the distortion, the plurality of light receiving elements is positioned to receive light from the lens mirror array, and the distortion is caused by the plurality of light receiving elements.

14. The method according to claim 13, further comprising:

measuring a distortion caused by the plurality of light receiving elements before placing the plurality of light receiving elements in the case.

15. The method according to claim 13, further comprising:

measuring a distortion caused by the plurality of light receiving elements after placing the plurality of light of light receiving elements in the case.

16. An optical device, comprising:

a lens mirror array including a plurality of transparent optical elements connected to each other along a first direction;

a case in which the lens mirror array is contained, the lens mirror array being fixed to the case, the case including jig insertion holes through which a manufacturing jig can pass, the jig insertion holes being spaced from each other in the first direction; and a plurality of light receiving elements inside the case and positioned to receive light from the lens mirror array, wherein the case includes at least three jig insertion holes through which the manufacturing jig can pass, the jig insertion holes permit portions of the manufacturing jig to press the lens mirror array in a direction intersecting the first direction to deform the lens mirror array, and the lens array mirror has been deformed to compensate for a positional error of the plurality of light receiving elements.

17. The optical device according to claim 16, wherein the transparent optical elements in the plurality of transparent optical elements are directly joined to an adjacent one of the plurality of transparent optical elements.

18. The optical device according to claim 16, wherein the case further comprises holes positioned to permit an adhesive to be supplied between the case and a fixing portion of the lens mirror array.

19. The optical device according to claim 16, further comprising:

a light source comprising a plurality of light emitting elements inside the case and positioned to emit light towards the lens mirror array.

* * * * *